United States Patent [19]

Anwar

[11] Patent Number: 5,767,854
[45] Date of Patent: Jun. 16, 1998

[54] MULTIDIMENSIONAL DATA DISPLAY AND MANIPULATION SYSTEM AND METHODS FOR USING SAME

[76] Inventor: Mohammed S. Anwar, 1222 Ridgeley Dr., Houston, Tex. 77055

[21] Appl. No.: 721,899

[22] Filed: Sep. 27, 1996

[51] Int. Cl.⁶ .................................................. G06F 3/14
[52] U.S. Cl. ...................................... 345/355; 345/419
[58] Field of Search ........................... 345/339, 349, 345/355, 440, 419, 329, 334; 707/100, 101, 102

[56] References Cited

U.S. PATENT DOCUMENTS

| | | | |
|---|---|---|---|
| 5,295,243 | 3/1994 | Robertson et al. | 345/419 |
| 5,414,802 | 5/1995 | Takamura | 345/419 |
| 5,517,602 | 5/1996 | Natarajan | 345/419 |
| 5,602,978 | 2/1997 | Lastinger | 345/419 |
| 5,666,472 | 9/1997 | Huddy | 345/419 |

*Primary Examiner*—Raymond J. Bayerl
*Assistant Examiner*—Cao H. Nguyen
*Attorney, Agent, or Firm*—Robert W. Strozier; J. M. (Mark) Gilbreth; Gilbreth & Strozier, PC

[57] ABSTRACT

This invention discloses a user interface and data management procedures for the efficient display, manipulation and analysis of multi attributed data or data amenable to multi-dimensional display, manipulation and management. The invention is centered on the construction and use of data carrousels comprising one or more n-gons where the each n-gon can be a layered n-gon at solid or each side of each n-gon can be a single face of an embedded n-gon.

10 Claims, 39 Drawing Sheets

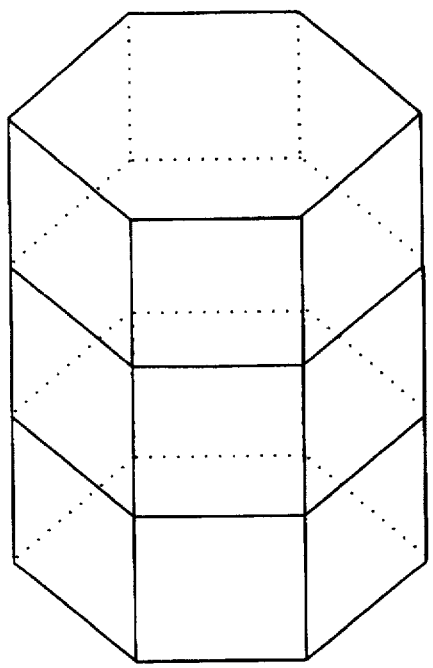
13
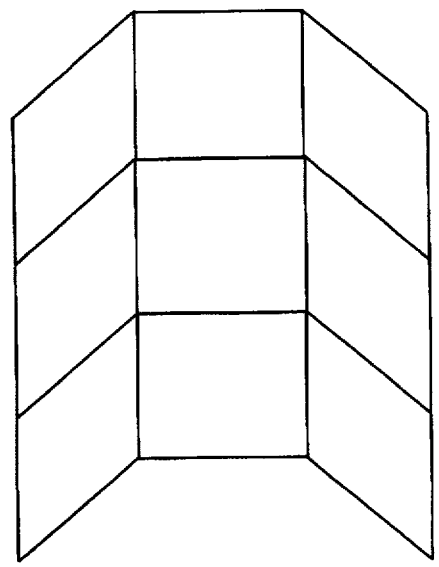
14
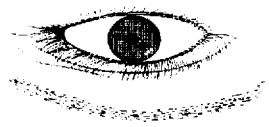

MULTIDIMENSIONAL DATA DISPLAY AND MANIPULATION SYSTEM AND METHODS FOR USING SAME

BACKGROUND OF THE INVENTION

1. Field of the Invention

This present invention relates to a computer, a computer memory or a digital storage device having stored therein or thereon a multi-dimensional display and manipulation system for the display, analysis and manipulation of multi-dimensional data.

More particularly, the present invention relates of a computer, a computer memory, or a digital storage device having stored thereon or therein a multi-dimensional display and manipulation system includes a user interface that displays multi-dimensional data in the form at least a first multi-sided geometrical object where at least a side of the first object has a second multi-sided geometrical object associated therewith or displays periodic data in the form of a periodical geometrical object having associated therewith at least one multi-sided object at each segment of the periodic object and a data manipulation subsystem which includes means for creating, storing, updating, deleting, modifying, and analyzing multi-sided data objects.

2. Description of the Related Art

Current spreadsheet technology is unable to efficiently handle multidimensional data. Hence, spin or rotate, drill-down or zoom-in, drill-up or zoom-out, slice, dice, navigate, rollup, roll-down, etc. functions are tedious. Additionally, in spreadsheet, the group operations are very cumbersome.

The current multidimensional technology uses the cube paradigm. Since a cube is a six-sided geometric object, it inherently imposes limitations on dimensions that can be represented by a singleton cube. Additionally, the technology also lacks the concept of the face of the cube itself containing other geometric shape(s). Thus, it would represent an advancement in the art to have a computer, a memory associated with a computer or a direct access storage device with a program encoded therein which is capable a fast, efficient and visually understandable retrieval, display, manipulation, analysis and storage of multi-dimensional data.

SUMMARY OF THE INVENTION

This invention provides a computer including a memory, at least one direct access storage device, at least one display device, and an electronic and/or digital communication system. The memory and/or storage device include at least one operating system, optionally at least one database system, and a multi-dimensional display and manipulation system. The operating system is any operating system well known in the art, but is preferably a windowing operating system. The database is any database system well known in the art. The multi-dimensional display and manipulation system includes an user interface and a multi-dimensional data object subsystem where the subsystem includes means for creating, populating, updating, manipulating, storing, retrieving, modifying and analyzing multi-dimensional data objects and the user interface includes means for displaying and graphically manipulating the multi-dimensional data objects in a window defined on a display device. The multi-dimensional data objects include multi-sided geometrical objects having a side for each dimensionality of the data to be represented by the data object. Each side of a given multi-sided geometrical object can be a single data value or an embedded multi-geometrical object. Thus, the data objects can display not only data having a single hierarchical level, but can simultaneously data having any number of hierarchical levels such as the structure of directors defined on a direct access memory device (disk) in the form of multi-sided geometrical constructs. The data objects are similar to carrousels within carrousels.

The present invention also includes a method implemented on a computer or stored in a digital readable format including the steps of creating multi-sided data objects, populating multi-sided data objects with data, manipulating the objects and the data contained therein, displaying the objects, retrieving, storing, deleting, updating, and modifying the objects and analyzing the objects for data trends or for report generation.

The present invention also provides a user interface and data management system that allow a user to more efficiently visualize, display, manipulate, and analyze multi-dimensional data. The user interface and data management system is designed to be implemented on a single computer and/or on a computer network including all type of computers from mainframes to PC's. The user interface and data management system work preferably in a computer environment using a windowing operating system. The present user interface and data management system will sometimes be referred to by the acronym MAGIC.

BRIEF SUMMARY OF THE DRAWINGS

For a further understanding of the nature and objects of the present invention reference should be made to the following Drawings, in which, like parts are given like reference numerals and wherein:

FIGS. 6a–b depict a top outside perspective view and a top inside perspective view of a 3D hexagonal data object, respectively;

DEFINITIONS

Figure 1:
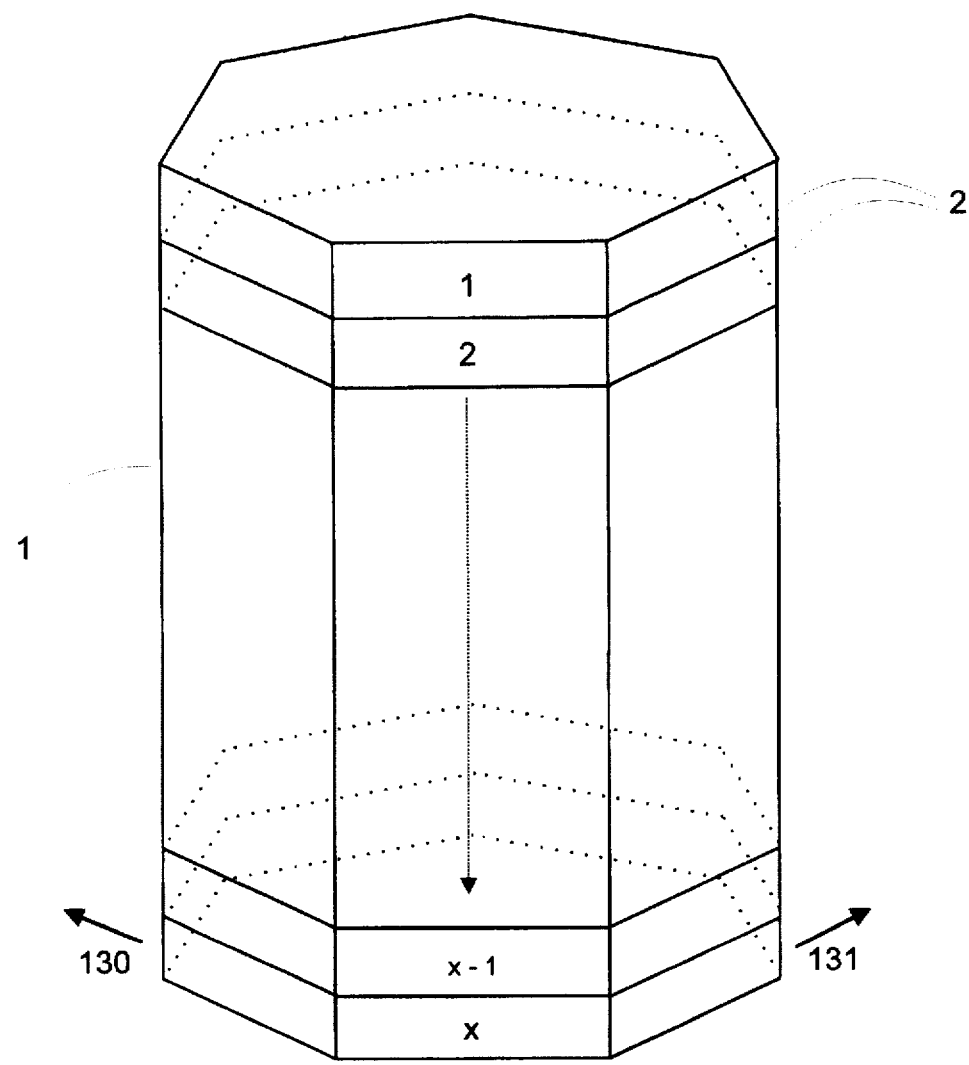
FIG. 1 shows a seven-sided (7-gon or heptagon), 3D data object or carrousel having x sections.

The following terms and associated definitions will be used throughout the specification.

Carrousel

A multi-sided geometrical presentation of data similar to a mechanical carrousel that revolves like a merry-go-round, as a revolving tray from which slides are fed one at a time into a projector, or a circular conveyor for displaying and transporting physical objects, in an airport from which arriving passengers pick up their luggage," i.e., data carrousels are geometrical multi-dimensional objects that can be subjected to various geometrical operation such as rotation, twisting, expansion, addition, subtraction, multiplication, division, etc.

N-Gon

Generic name for polygon and/or polyhedron having n sides, i.e., n represents the number of sides of the polygon or polyhedron being represented.

Drill-down and Zoom-In

The action of moving from a higher-level to a more detailed-level, or the operation of shifting from coarser to finer granularity, or the transformation from an abstract concept to a concrete confidence. Thus 'Down' and/or 'In' will represent operations that show more detail. Opposite of drill-up or zoom-out.

Drill-up and Zoom-out

The action of moving from a detailed-level to a higher-level, or the operation of shifting from finer to coarser granularity, or the transformation from a concrete confidence to an abstract concept. 'Up' and/or 'Out' will represent operations that show less detail. Opposite of drill-down or zoom-in.

Rotate and Pivot

Rotating and/or Pivoting is the process of changing the dimensional order. Rotating and/or Pivoting allows transpose operation on layers, sections, and n-gon.

Slice and Dice

Slice and Dice implies movement between n-gons, sections, or layers, or movement from one object of a given dimension to another object of a different dimension.

Attribute

Any property, quality, or characteristics that can be ascribed to a person, place or thing. An example of attribute is a persons age or color of an object. The value of an attribute 'age' could be 25 years, and the value of color could be green.

Section

A slice, a division, a part, or a portion. Imagine a n-gon as a building, then a section would be a floor in the building.

Layer

Imagine a n-gon as a building, if a section is a floor in the building, then a layer would be an office on a floor.

Roll-up

Roll-up implies collapsing a 3D multi-dimensional representation into a more compact 3D multi-dimensional representation which normally results in the information being coarser or less detailed. Opposite of the operation of roll-down.

Roll-down

Roll-down implies expanding a 3D multi-dimensional representation into a more expanded or detailed representation. Opposite of the operation of roll-up.

Multi-dimensional

Multi-dimensional is any set of information that has associated with it many attributes which require considerably more that three dimensions to display, analyze and manipulate the data, i.e., each country, each state within a country, each city within each state within each country, etc. Moreover, each permutation of set of data can itself represent a dimension.

Polygon

A plane multi-sided geometrical object. A regular polygon can be inscribed within a circle. A polygon is defined by a given angle defining a given set of sides. A polygon is a closed plane object bounded by straight line segment as sides. A polygon of n sides is called n-gon. Following are some examples:

| 3 sides  | triangle    | 3-gon  |
|----------|-------------|--------|
| 4 sides  | quadrilateral | 4-gon |
| 5 sides  | pentagon    | 5-gon  |
| 6 sides  | hexagon     | 6-gon  |
| 7 sides  | heptagon    | 7-gon  |
| 8 sides  | octagon     | 8-gon  |
| 9 sides  | nonagon     | 9-gon  |
| 10 sides | decagon     | 10-gon |
| 11 sides | undecagon   | 11-gon |
| 12 sides | dodecagon   | 12-gon |
| 15 sides | pentadecagon | 15-gon |

Equilateral

A polygon having sides of equal length.

Equiangular

A polygon having equal angles.

Regular

A polygon having both equilateral and equiangular.

Polyhedron

A solid object with several plane surfaces. A solid object bounded by plane (flat) surfaces. A polygon becomes a polyhedron in 3D geometry. The five regular polyhedra are:

| tetrahedron (pyramid) | 4 faces  |
|-----------------------|----------|
| hexahedron (cube)     | 6 faces  |
| octahedron            | 8 faces  |
| dodecahedron          | 12 faces |
| icosahedron           | 20 faces |

Extensions Of Plane Geometry To 3-D Geometry

A line becomes a plane; a triangle becomes a triangular solid or a pyramid or a tetrahedron; a square becomes a cube; and a circle becomes a sphere.

Tessellation

Is the operation of paving a surface in a mosaic pattern of small, square blocks or shapes. Tessellation is a mathematical term to cover a plane without gaps or overlaps. Although it is possible to tessellate a plane with a lot of different shapes, the following are the only three self-tessellating regular polygons: triangle; square; and hexagon.

Circle

Circle represents a n-gon with infinite sides.

Transformation Of Spreadsheet Into A N-Gon And Vice Versa

A spreadsheet can be folded into an n-gon, where each fold corresponds to a face of the n-gon, or each fold corresponds to a dimension. There can be multiple sub-fold (s) within a fold, this construct corresponds to an n-gon within an n-gon. Conversely, an n-gon can be unfolded into one or more spreadsheets.

N-Gons And Dimension Representations

A polygon with n sides is called an n-gon. The following are examples of n-gons and their dimensionality:

n-gon with a single side represents 1D (one dimensional) space;

n-gon with two sides—x and y axes—represents 2D space;

n-gon with three sides (triangles) represents 3D space;

n-gon with four sides (quadrilaterals, rectangles or squares) represents 4D space;

n-gon with five sides (pentagons) represents 5D space;

n-gon with a very large number of sides is represented by a circle and represents nD space.

DETAILED DESCRIPTION OF THE INVENTION

The inventor has found that a new multi-dimensional display and manipulation system can be implemented on a computer or in a computer memory that allow a user to display, manipulate and analyze large data structures that have many different levels and types of data. The system provides software methodology for reading multi-dimensional information and creating multi-dimensional data objects that are displayable on a display device where each dimension of the data is represented by a side of an n-gon contained in the data object.

The data objects are generally n-gons or n-gonal solids. The objects may be simple polygons or a set of polygons within polygons to form a nested carrousel like structure that can be used to display large amounts of multi-valued data where the number of polygons and the number of sides of each polygon corresponds to the hierarchy of the data and the number of data values at each level, respectively. Thus, a collection of categorized data where each level is multi-valued can be displayed as a collection of n-gon where each n-gon has the same number of sides as the number of data values in each level of the categorical structure. The same procedure will work on hierarchical data as well. Each side of the data objects of the present invention can be a side of an embedded object which can itself be the side of an embedded object and so on. The n-gons in each level can be rotated as a carrousel so that the data at each level can be visualized, analyzed and understood. The data objects can then be stored and/or manipulated, updated, edited, refined, compacted, de-compacted, joined, differenced, summed, dissected and retrieved.

The method of the present invention provides visual display and manipulation procedures for multi-dimensional data and data structures and periodic data and periodic data structures where: (1) information can be synthesized from data; (2) data visualization can be simplified for easy comprehension/understanding; (3) data can be logically grouped; (4) group operations can be performed on the data in an simple and straight forward manner; (5) report generation can be simplified; (6) data administration can be performed easily and understandably; (7) decision making can be simplified; and (8) trends and data relationships can be more easily visualized and uncovered.

The present invention relates to a method implemented on a computer or in a computer memory or contained on a computer readable, digital storage device for display and manipulation of multi-dimensional data. The method and associated code implementing the method is sometimes referred by the acronym MAGIC which stands for Multidimensional dAta Graphical Interface Carrousel.

MAGIC utilizes n-sided polygons (n-gons) or polygonal solids to represent multi-dimensional data. Each n-gon is like a carrousel displaying data instead of items where the n-gons can be rotated or spun about a central axis (spin left or right); while n-gonal solids can be rotated about an axis of symmetry, moved up or down through level or sections, and each level or section can be rotated or spun independently.

Referring now to FIG. 1, an example of a data object is shown which is a heptagonal solid 1 is shown. The n-gonal solid 1 has a plurality of levels 2. Each level 2 can spin about the central axis of the solid 1 independently; while the entire solid 1 can be rotated left 130 or right 131 by activating an appropriate spin operator or icon or other rotating procedure as is well known in the art.

Figure 2:
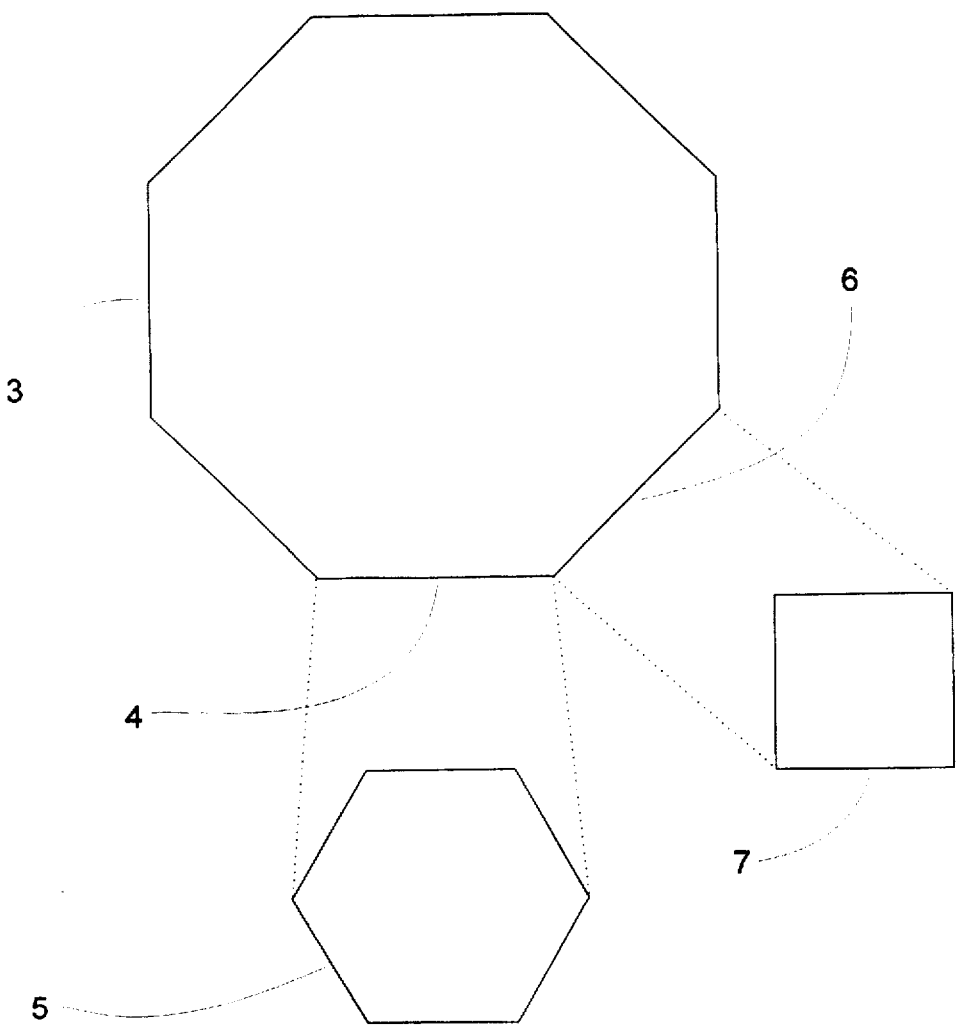
FIG. 2 shows an eight-sided carrousel (octagon or 8-gon) where a first side or face is a six-sided carrousel (hexagon or 6-gon) and a second side is a four-sided carrousel (square or 4-gon)
Figure 3:
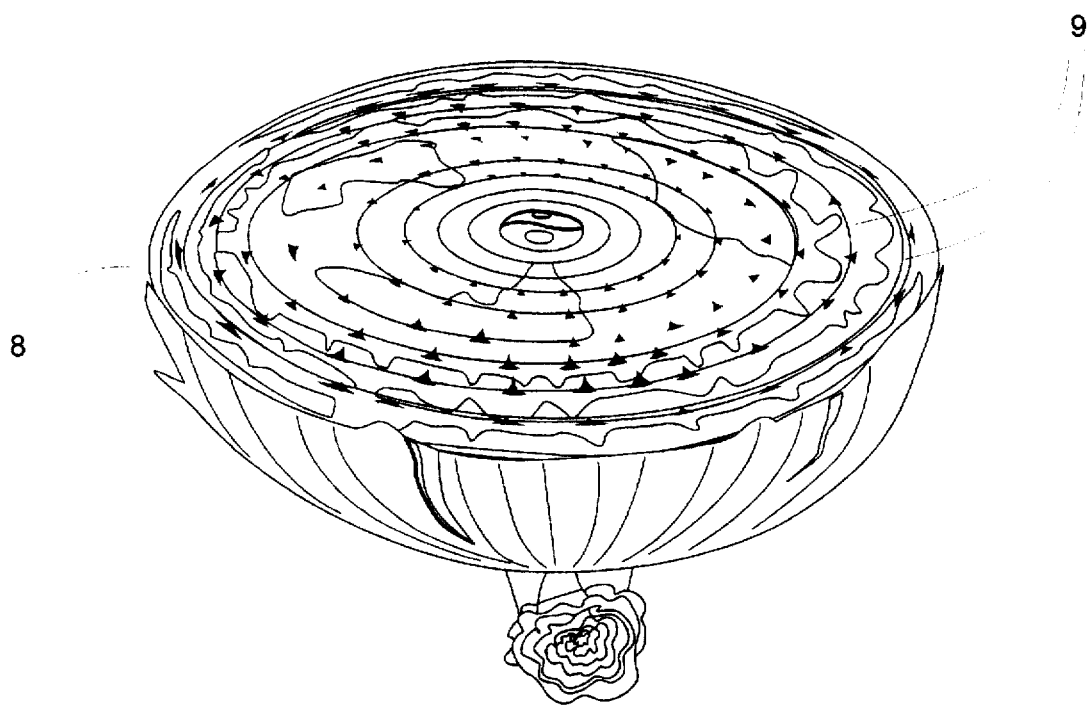
FIG. 3 shows an onion having layers.
Figure 4:
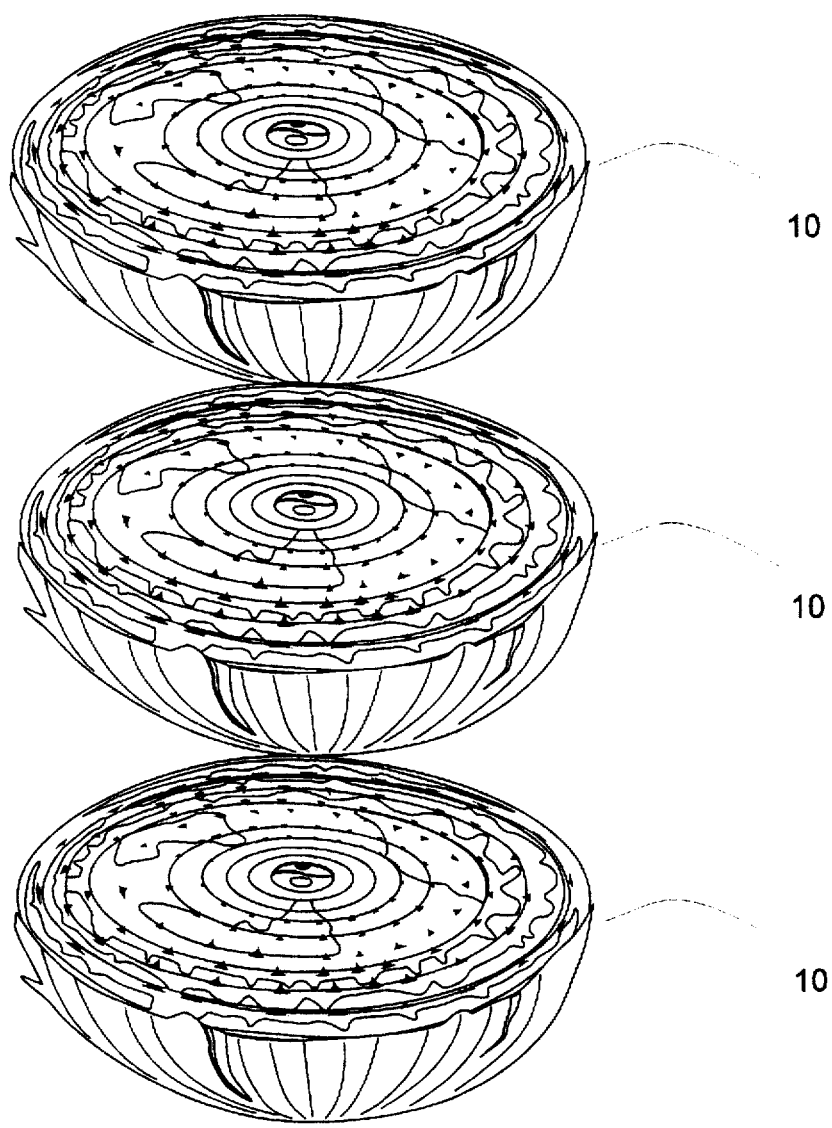
FIG. 4 shows a stack of onions forming a tower like structure.

Additionally, if a given face of a given n-gon represents one value of a multi-valued attribute, then the face or side of the embedded n-gon can spin independently of the any other face(s) or side to display different data values just like a carrousel can be spun to display other items. Hence, the data structures can be represented by n-gons within n-gons analogously to carrousels within carrousels as shown in FIG. 2. FIG. 2 shows an n-gonal representation of hierarchical data including an octagon 3 representing an eight valued data level where a first side 4 is an embedded hexagon 5 representing a six valued data level and a second side 6 is an embedded square 7 representing a four valued data level.

This nesting or embedding of n-gons or carrousels can extend ad infinitum, limited only by the data structure being analyzed and by computer resources or human imagination. Each n-gon, level, layer, section, sub-section or sub-carrousel (sub-n-gon) of a given n-gonal representation or carrousel representation is preferably a logical grouping of data or an object as described in the Object Oriented Paradigm (OOP). I call this construct a Data Carrousel or Data Object.

Each dimension or attribute of data is represented by a side of a polygon within a Data Carrousel. Hence n-dimensions or n-attributes of a given type of data or data level can be represented/visualized by a single n-sided polygon (n-gon). Moreover, groups of related n-gons can be stacked upon each other to form a tower like structure of n-gons of the same dimensionality as shown in FIG. 1. Of course, the n-gons can also be of different dimensionality. Alternately, the groups of dimensional data can be represented by a layered structure like an onion, a more compact structural representation.

These two representations are equivalent and MAGIC can transition between these two representations in response to a user selected function. The tower or layered structures can then be displayed side-by-side or stacked to form n-gonal solids as shown in FIGS. 10, 11, 13, and 14. Although each face or side of each n-gon can represent a given data value for that data level, the faces or sides can also be displayed as a spreadsheet of the data values of that data level where a data level is a set of data of the same type in a data classification structure or a hierarchical data structure.

Figure 5:
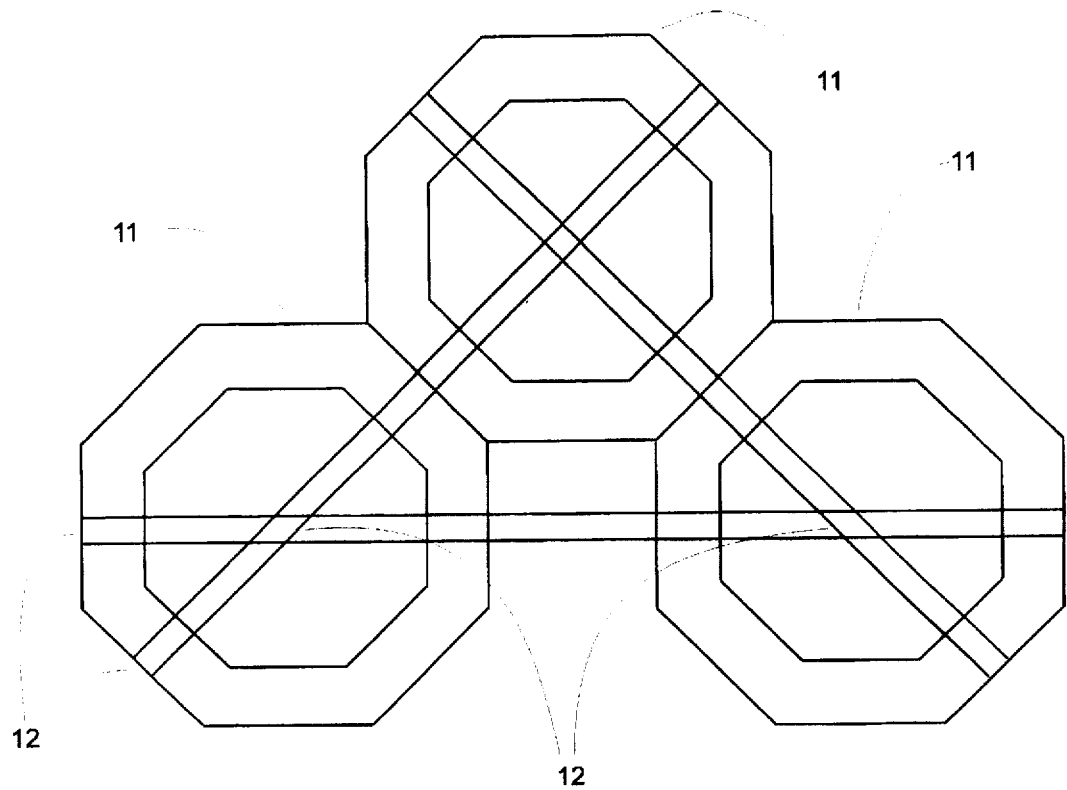
FIG. 5 depicts three n-gons having relationships defined between the data contained within at least one side of two n-gons.

Moreover, n-gons can be placed together to tessellate a plane as shown in FIG. 5 where n-gons 11 are placed so that the n-gons 11 have some shared sides. Relationships and formula can be also defined between n-gons (intergonal) and/or within n-gons (intragonal). Furthermore, relationships and formula can be defined between sections, levels, or layers or within sections, levels or layers. Of course, such relationships can be described in any permutations of inter-gonal relationships 12 and intragonal relationships as desired.

MAGIC allows a user to look at data from any number of views including an outside view 13 or an inside view 14, as shown in FIG. 6, as well as front, side, back, top, bottom, and perspective views depending on the user's desire.

The products and processes of this invention which are collectively referred to as MAGIC can included data objects with compact structures such as layered structures that can be pulled out to form tower structures, or tower structures that can be compressed into layered structures. Alternatively, MAGIC can represent data objects within objects such as canisters within canisters. Moreover, MAGIC can represent periodic data by displaying a periodic geometrical object like a helix where the helix is a string of n-gonal data objects aligned so that each turn of the helix represents on full period of the data, e.g., daily, monthly, yearly, etc. Of course, the helix turn rate can be adjusted to any set number. Additionally, the periodic data can be represented by other periodic functions such as sine or cosine curve, spirals or the like.

MAGIC can be used by business analysts, data miners/surfers, executives, developers, administrators, and knowledge workers. MAGIC includes an user interface (UI) with associated tools and operators and/or a graphics user interface (GUI) with associated graphics tools and operators. MAGIC provides multi-dimensional analysis directly without loading or pre-summary calculations. MAGIC can be implemented to perform its analytical processing on a database server transferring only the final result set to the user to reduce network traffic. MAGIC provides a business perspective to data mining as opposed to the academic perspective. MAGIC has the flexibility to be implemented in either one-tiered, two-tiered or three-tiered architecture.

In order to facilitate analysis, MAGIC provides 1) n-number of undo and redo options, 2) n-number of options to save various states of analysis scenarios as is well known in the art. These options will encourage the user to perform analysis without concern for lost intermediate values, because the user can revert back to a particular state by employing a series of undo and/or redo commands, or the user can discard the new analysis and go back to a saved state.

At any level the user can view a road-map of present state or location of an analysis or data structure to aid in navigation through the analysis or through the visualization and/or manipulation of the data structure.

From a programming point of view and a user point of view, MAGIC is a component-based program implemented on a computer or in a computer memory. MAGIC can also be used as a data mining/surfing tool which can be implemented within a client/server architecture.

In the center of each n-gon within a n-gonal data representation, there are a local domain, zone, region or area and a global domain, zone, region or area for the definition of relationships and/or formula between data values or between data objects to form new data objects which contain the data generated by the operation of a formula on a give set of data objects or from the defined relationships on the data objects.

MAGIC provides: (1) rapid response and rapid solution development; (2) interpretation and processing of the request; (3) abstraction/semantic layer; (4) business view; (5) custom model development; (6) high performance; (7) conceptual view of data; (8) ad hoc grouping of dimension members; (9) decision support solution; (10) intuitive and efficient analysis; (11) advanced analytical processing capabilities; (12) hyper-information interfaces; (13) open and scalable architectures; (14) automatic discovery procedures; and (15) matrix and cross-tab mathematics can be defined on n-gons MAGIC Building Blocks The product of the present invention which resided in a computers memory has a user interface (UI)—presentation & display logic—and/or a graphics user interface (GUI) and a multi-dimensional data manipulation system. The data manipulation system includes: (1) a meta-data manager (MDM); (2) at least one pro-active agent; (3) a pivot manager; (4) an IO broker (syntactically and/or semantically intelligent); (5) import and export routines; (6) a database connectivity engine (DCE) which provides procedures to map data from different/multiple databases and display as a single schema; (7) dynamically generated SQL routines to optimize runtime performance; (8) a query estimate manager; (9) size and times keeping routines; (10) a data carrousel or object controller (DCC); (11) a selection exception agent (SEA); (12) a spreadsheet controller (SC); (13) optionally as plurality of wizards; (14) a Schema Synchronization Manager (SSM); (15) a threads manager; (16) a macro and/or scripting language manager (MM); (17) an API set; (18) an analytic engine (AE); (19) calculations, computations, and manipulation routines; (20) filtering and/or exception routines; (21) a communication manager (CM); (22) an E-mail interface; (23) a fax modem; and (24) a pager interface.

Data Population Mechanisms

Data can be entered into the multi-dimensional data manipulation system in a number of methods, including, without limitation: retrieval from a database; input by the user via a combination of or solely through keyboard, mouse, voice recognition system, etc. commands; copy/cut and paste routines; through Inter Process Communication (IPC) (e.g. Dynamic Data Exchange (DDE), Object Linking & Embedding (OLE), etc.); input from a file or files; and voice recognition routines.

Use of Color During Data Analysis

The UI or GUI can include color to enhance and render visualization of trends and relationships easier and friendlier. For example, assume that the desired range of values is to be represented by green, the undesired range of values is to be represented by red, and an intermediate range of values is to be represented by yellow. Further assume that the outermost layer of a section of a n-gonal solid data representation contains the desired range of values, and the undesired range of values is furthermost—inner most—from the user (as the n-gon appears in a computer display device). Let the above mentioned color scheme represent the data values. Then the color of the layers—from outside to inside—will transition from green to yellow to red. How fast or how slow this transition occurs, is consistent with the distribution of the data. The use of color changes or gradients of a single can be used in analyzing data object sections and/or n-gons. Such color coding can be used to visualize and analyze n-dimensional data to find objects such as at tractors or to find trends in financial data, scientific data, or the like.

Dynamic Row and Column Allocations

In the current spreadsheets, the number of rows and columns are fixed; in other words the user is unable to alter or change either the row or the column number. On the other hand, the Spreadsheet Controller of the present invention allows the user or the method itself to dynamically define and/or allocate rows and columns; as long as the product of the rows and the columns (rows times columns), does not exceed the resources of the computer system on which the multi-dimensional system is implemented. This feature allows the user to manipulate more values—records—for fewer variables, or more variables for less values.

Example of Dynamic Row/Column Allocations

Suppose, due to hardware and/or software resource constraints, a hypothetical spreadsheet provides 10 fixed columns and 100 fixed rows. Therefore, the product of 10 columns and 100 rows is 1000 cells. In the product of this invention, with the same hardware and/or software resource constraints, the user can define the following illustrative cell layouts:

2 rows×500 columns=1000 cells
500 columns×2 rows=1000 cells
3 columns×333rows=999 cells (highest value less than the constraint)
333 columns×3 rows=999 cells (highest value less than the constraint)
20 columns×50 rows=1000 cells
50 columns×20 rows=1000 cells Of course, any combinations of two positive integers, greater than zero, whose product is less than, or equal to 1000 well also work. Of course, all combinations of two numbers where both are greater than 3 can be represented by n-gon or carrousels. Additionally, the 1000 cells could be fragmented into numerous n-gons and carrousels provided the 1000 cell limitation is not exceeded.

MAGIC Overview

Following steps broadly describe how the MAGIC functions:

Step 1

Figure 7:
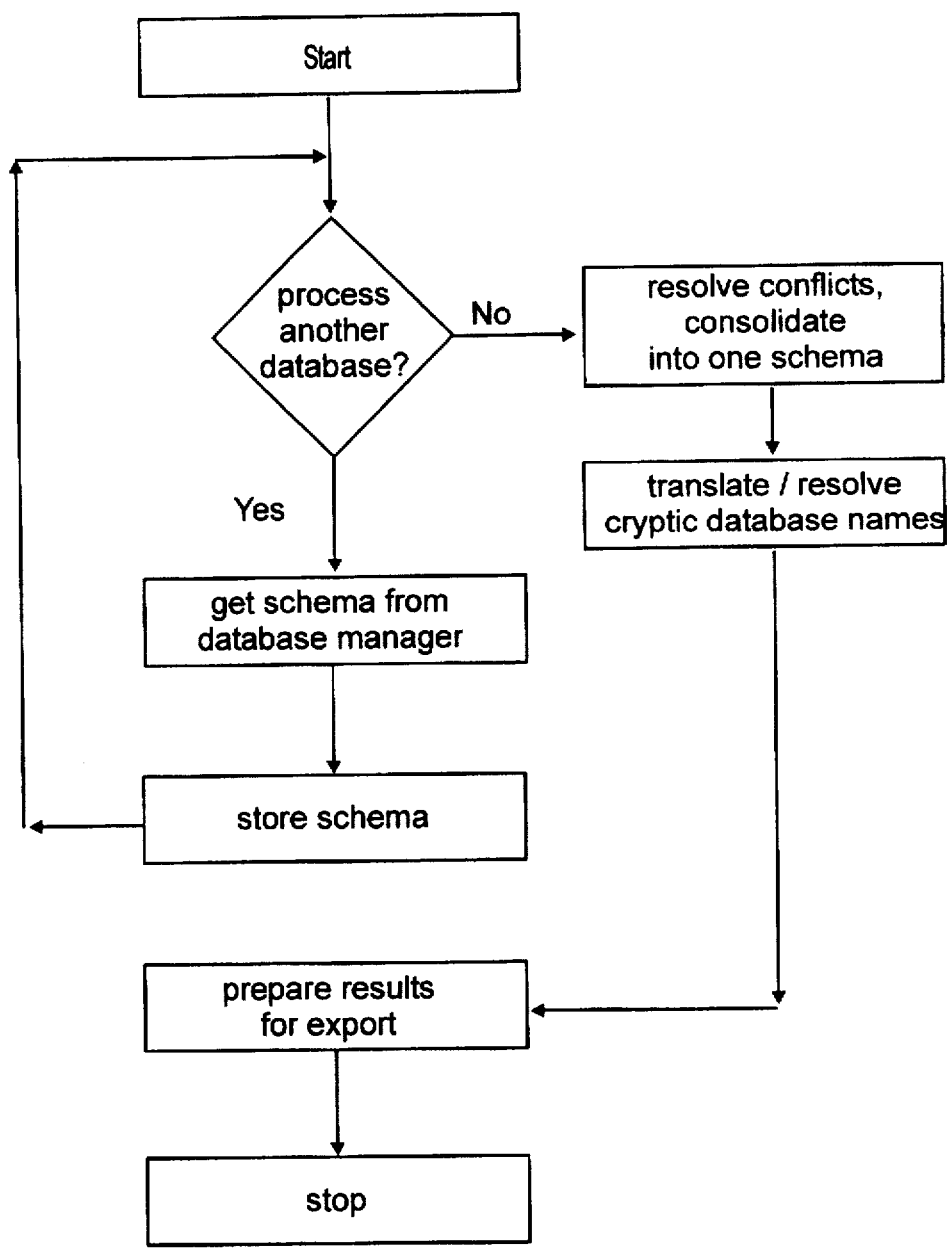
FIG. 7 is a schematic flow chart of the steps performed by the Meta Data Manager of the present invention.

One of the many ways the user can populate data into this tool is by retrieving data from a database as shown in the flow chart schematic of FIG. 7. In order to populate data by this mechanism, the user will invoke a function obtain a desired set of data from the database or databases in the form of a consolidated schema which is presented in the form of a list-box, tree, dialog-box, wizard, an user specified form, or the like in a display window of a display device. The basic process includes selecting the operator or icon to start the routine, obtaining a database to be processed; retrieving and store the database schema from the database manager. The user can then select another database and the above steps are repeated. Once all the database schema have been obtained, the routine analyzes the schema and resolves any conflicts and combines or consolidates the database schema. The consolidated schema is translate and resolve to convert encrypted database names to a user understandable format. The final schema is prepared for export to the multi-dimensional manipulation system and the GUI and control is to the calling routine.

Step 2

Figure 15:
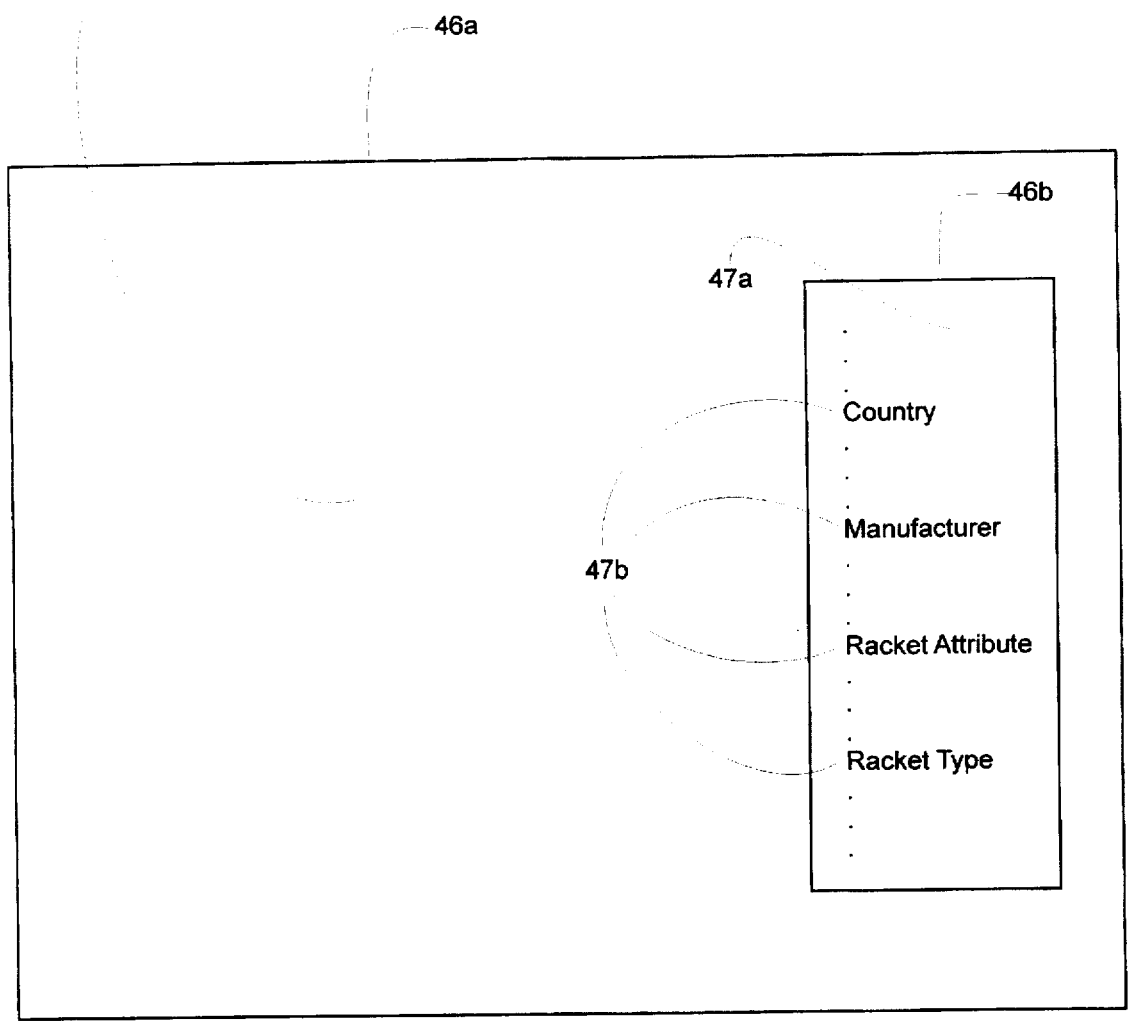
FIG. 15 depicts the user interface for extracting database schema information from a database to create a tree-definition in a tree-definition area.
Figure 17:
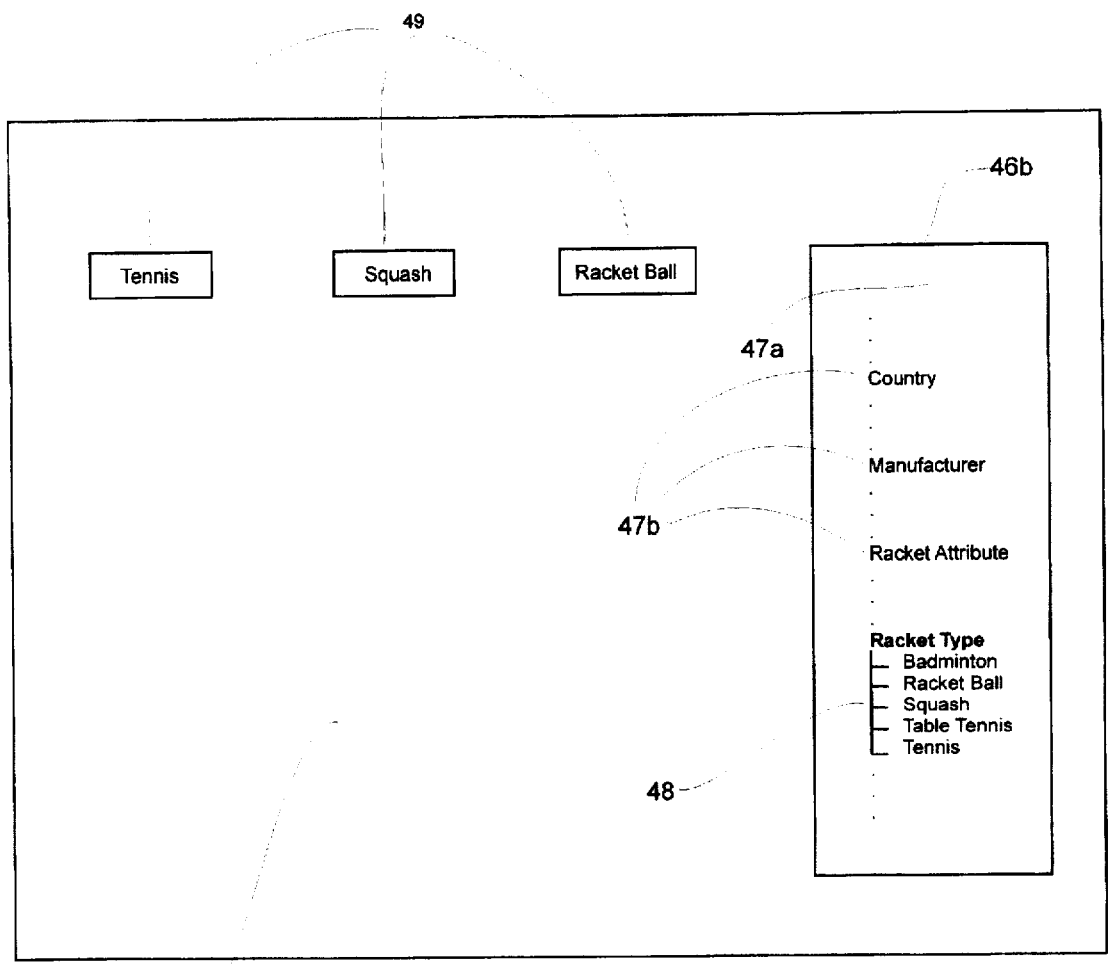
FIG. 17 depicts the user building a tree-definition structure from the database schema information where each arrow represents a relationship.

Once the consolidated and decrypted schema has been exported, the GUI displays the schema as a list in a schema display region 46b of a display window 46a of a display device (not shown) as shown in FIG. 15. The user can then select items 47b from the displayed schema list 47a and drag-and-drop the items 47 into a tree-definition area 129 of display window 46a as shown in FIG. 17. At the time of the drag-and-drop, the user has the option of assigning a new name to the item or the user can let the system use the item's name as it appears in the list. Additionally, the user will have the option to rename the item at a later time by selecting an item rename function as is well known in menu based function lists. The naming options will apply to all subsequent drag-and-drop actions.

Figure 18:
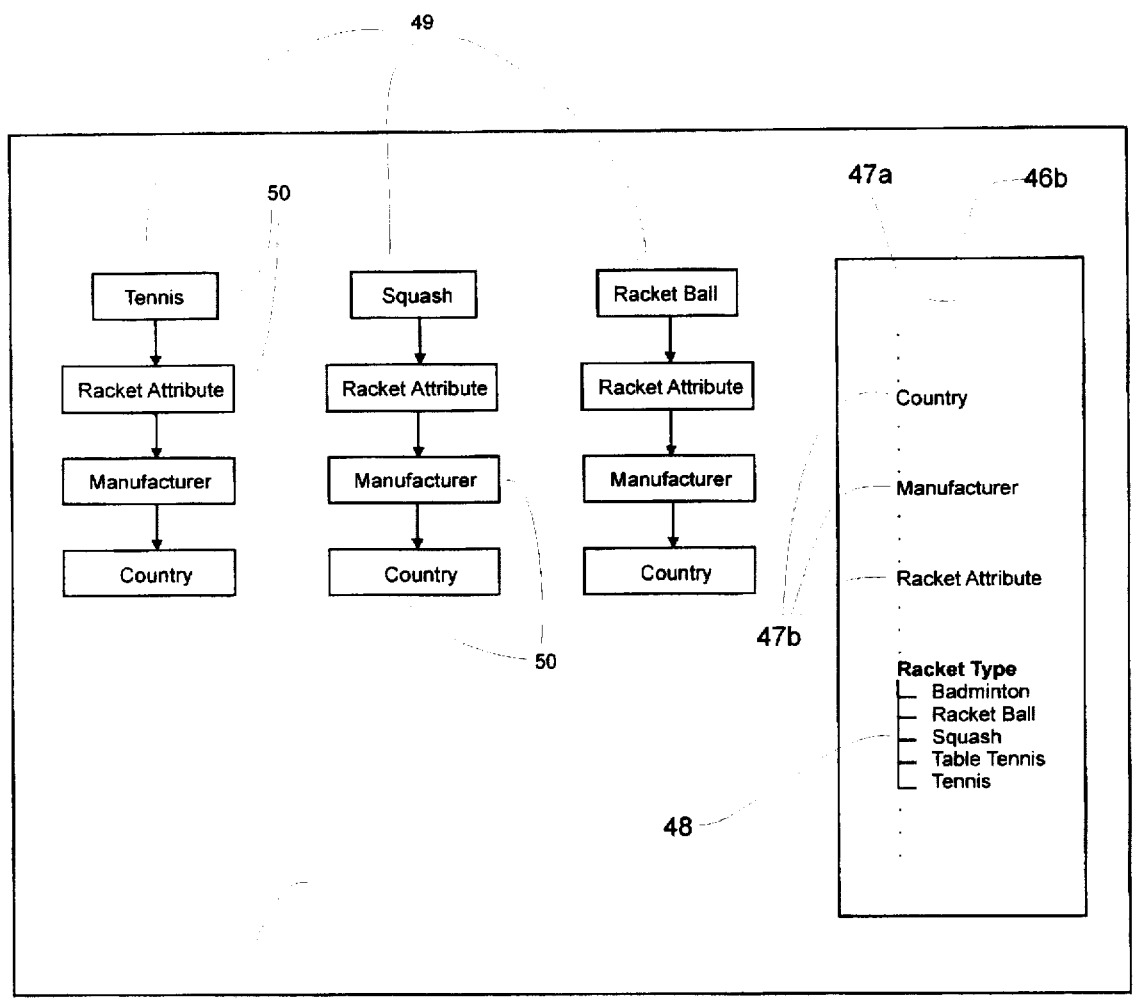
FIG. 18 depicts the user's continues building of the tree-definition structure of FIG. 17.

Next, the user will select a second item from the list 47a and drag-and-drop a second item 47b into the tree-definition area 129 of the display as shown in FIGS. 17 and 18. Upon completion of this drag-and-drop, the user will have the option to define a relationship 50 such as a parent-child relationship between any two items in the tree-definition area 129 or redefine existing relationships between the items. These relationship definition options will apply to all subsequent drag-and-drop actions. Of course, other types of relationships between the data attributes can be defined as well.

Figure 19:
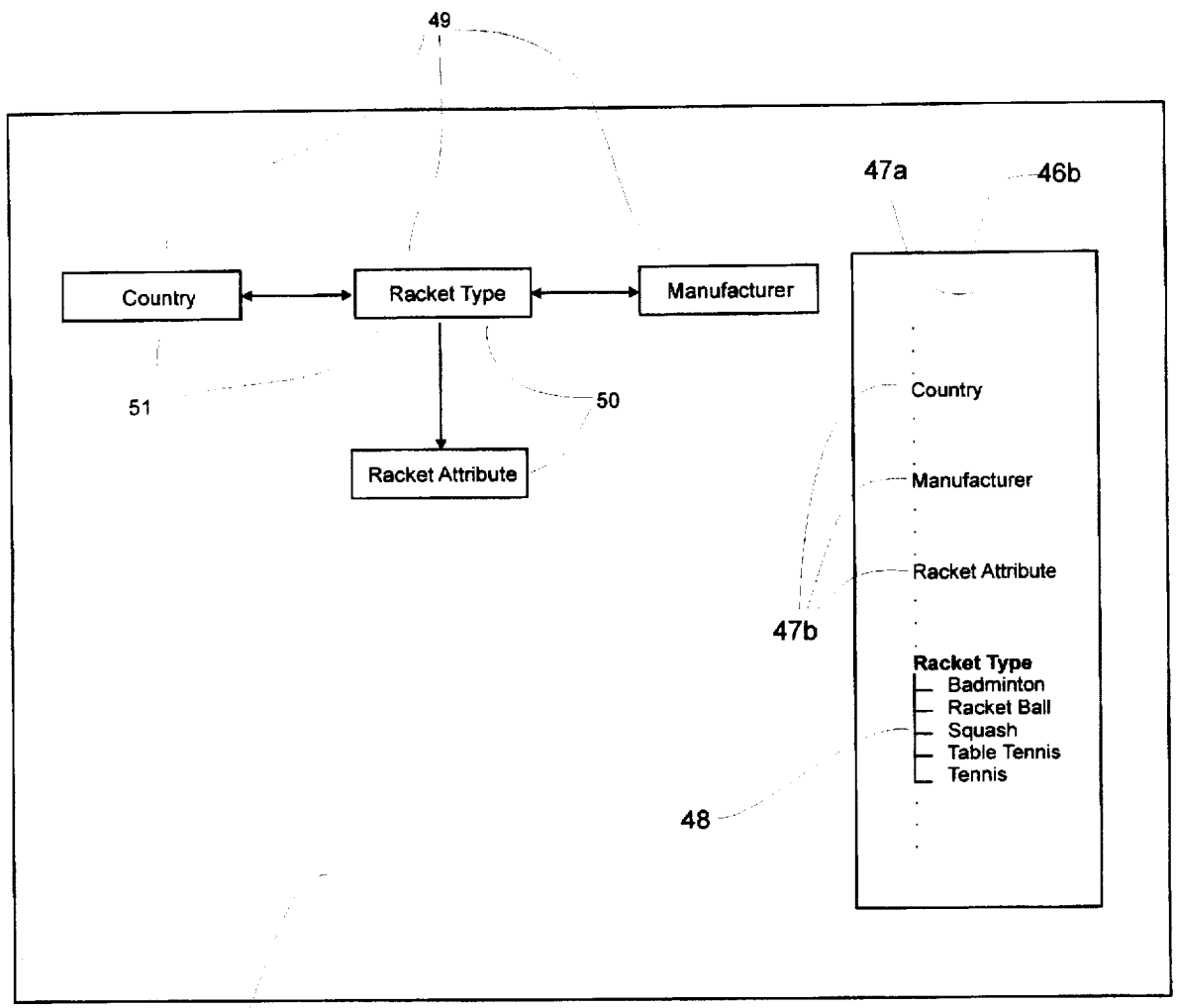
FIG. 19 depicts an alternate tree-definition structure built from the database schema information.

The user is free to describe more than one tree definition simultaneously as shown in FIG. 18. The user then will proceed to select all the necessary items from the list and drag-and-drop them on the tree-definition area as shown in FIG. 18 or 19. The drag-and-drops can occur one item at a time or many items at a time by using block selecting functions as are well known in the art.

Figure 8:
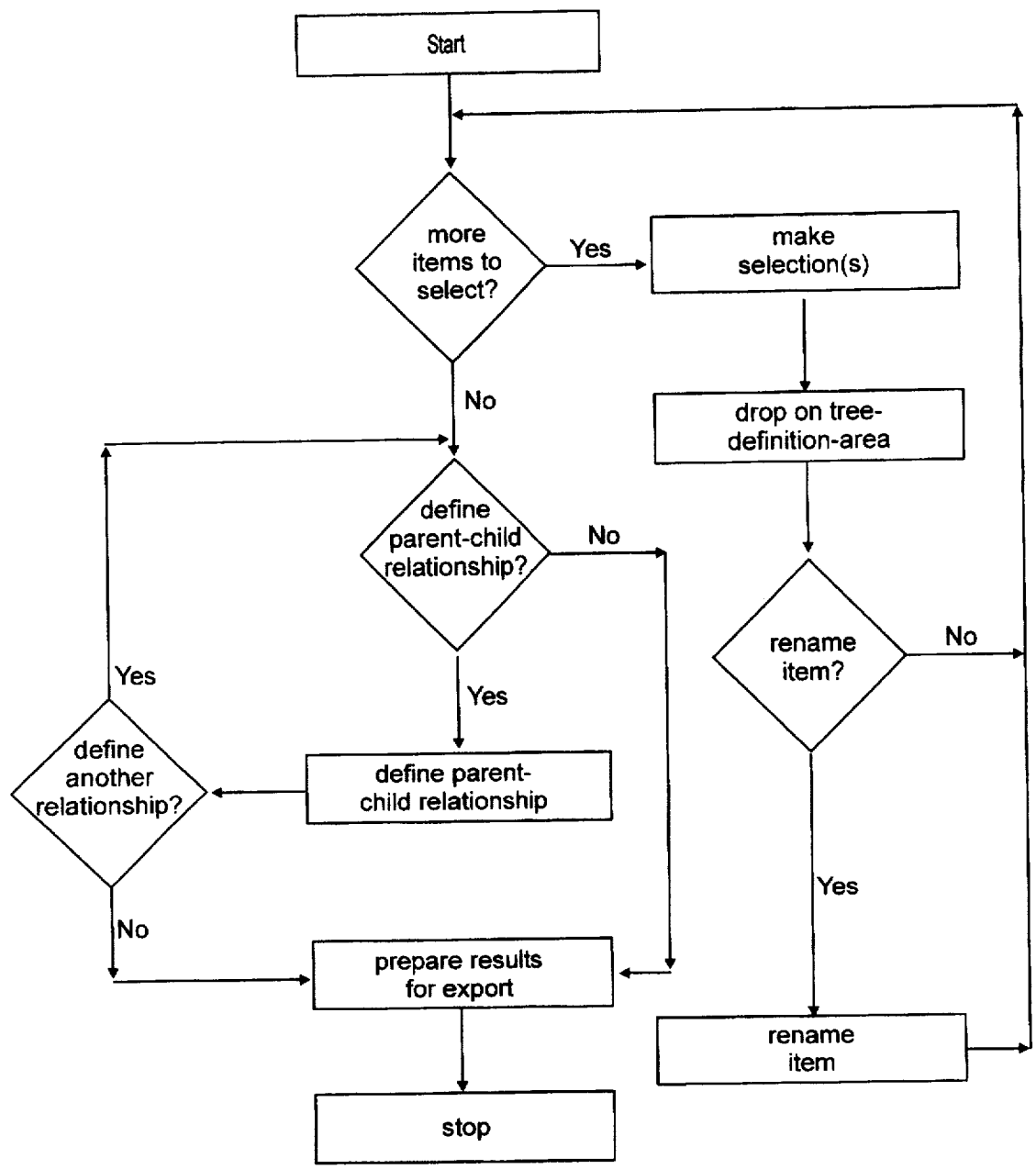
FIG. 8 is a schematic flow chart of the steps performed by the Schema Synchronization Manager of the present invention.

When all the items have been drag-and-dropped onto the tree definition area and all desired relationships are defined, the user can rename any item and/or redefine/rearrange any part or the entire tree before proceeding to the next step by block a move or copy operations as shown in FIG. 19. These operations are shown schematically in FIG. 8. The user starts the routine, the routine prompts the user for another item selection. If the user make a selection, then the item is dropped into the area 129. The user is then queried as to renaming. If the rename fiction is engaged, the user enters a new name and the item is renamed accordingly. The routine continues the selection process until the user completes selection. Once the selection process is complete. The user is queried regarding establishing possible relationships between the items. The routine then continues to define relationships until the user is satisfied with the tree structure. The desired tree structure is then prepared for export and the routine returns control to the GUI.

Step 3

Figure 9:
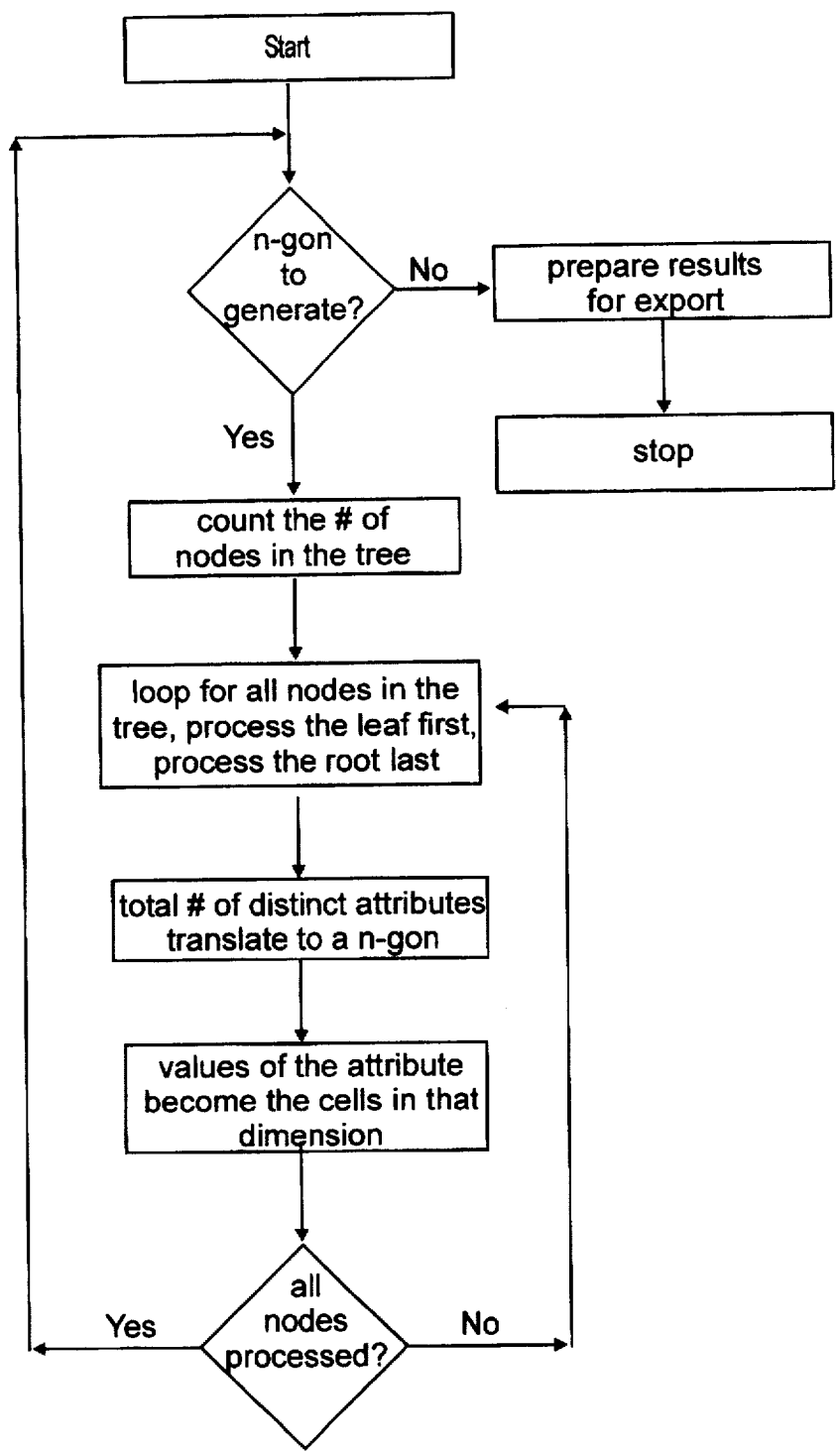
FIG. 9 is a schematic flow chart of the steps performed by the Carrousel Controller of the present invention.

Now that the data has been organized into a tree definition and exported, the user invokes a routine displayed in the GUI display to instruct the manipulation system of MAGIC to generate an n-gon representation of the data and extract the necessary data as defined in the tree-definition area to populate the n-gon representation of the defined data structure. The steps for performing the n-gon construction are schematically described in FIG. 9. The n-gon construction includes activating the routine, looping over the data level; counting the number of nodes; looping over all node and determining node dimensionality (i.e., number of leaves); and generating an n-gon; populate the n-gon with appropriate data values. If no more n-gons need to be generated, the n-gonal representation is ready for export to the GUI or to another program and the routine return control to the calling routine.

Step 4

When a certain aspect of data can be displayed in more than one way, MAGIC will allow the user to select the appropriate option interactively by employing a wizard or a cuecard like routine. The user will have the option to undo and/or redo as many times as the computer resources allow.

Figure 10:
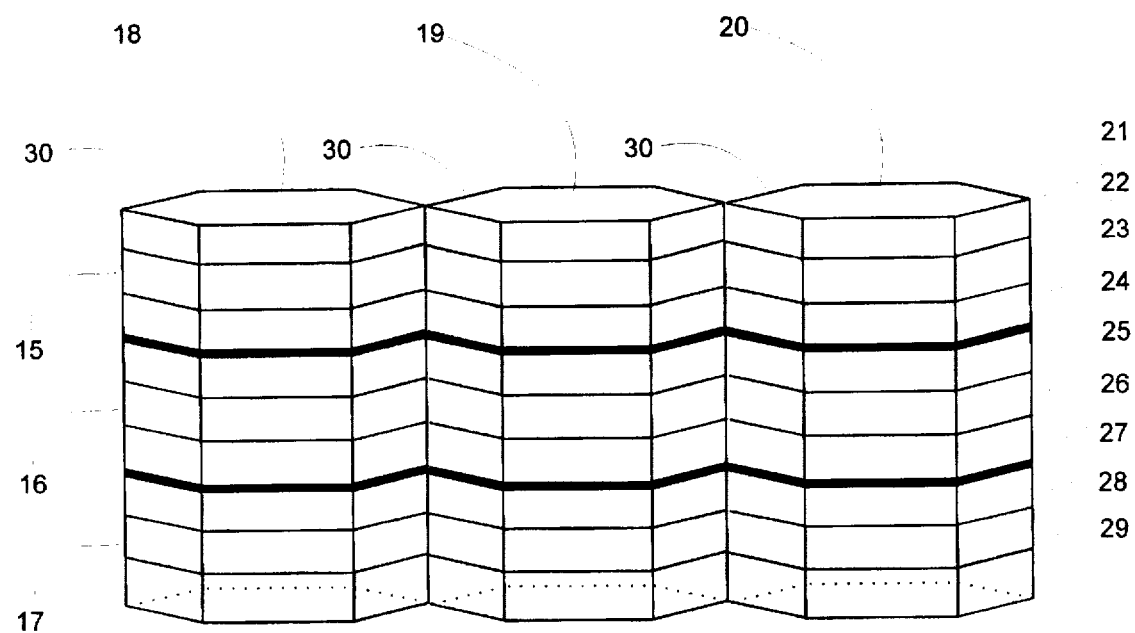
FIG. 10 depicts three, 3D n-gons having a plurality of levels which can be used to represent three different countries, the manufacturers in each country, the different racket types made by each manufacturer and the attributes associated with each racket type.
Figure 13:
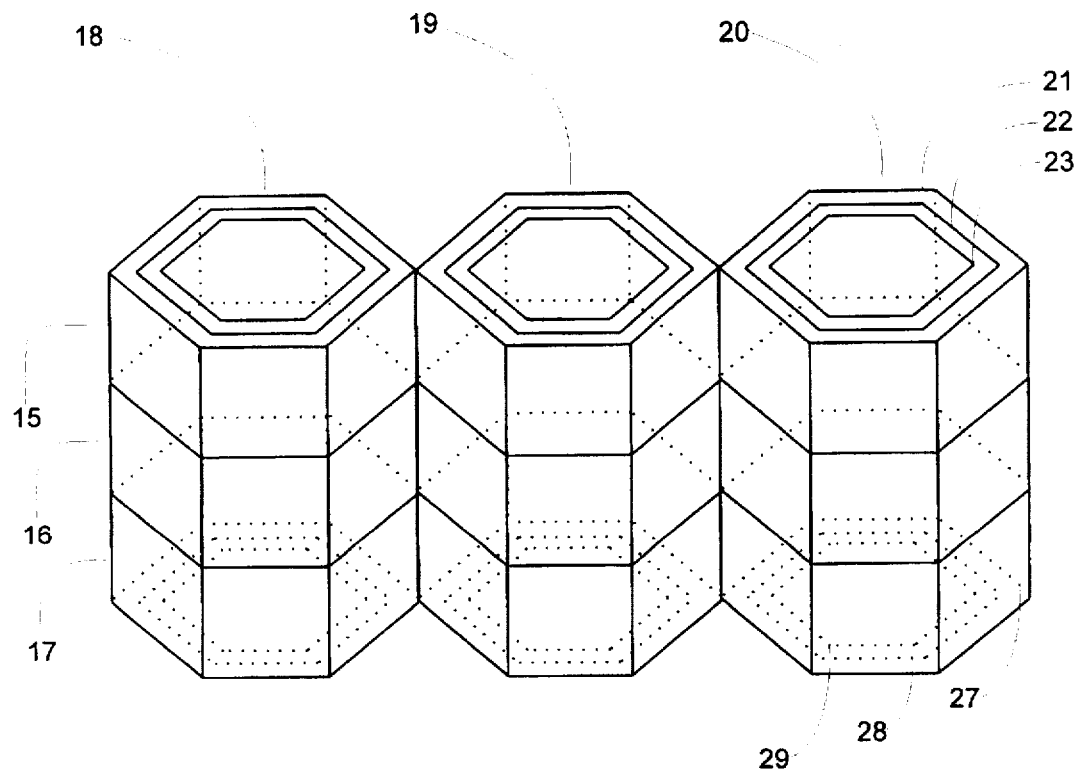
FIG. 13 depicts the levels of the 3D n-gons of FIG. 10 or 11 in an layered—onion—format.
Figure 14:
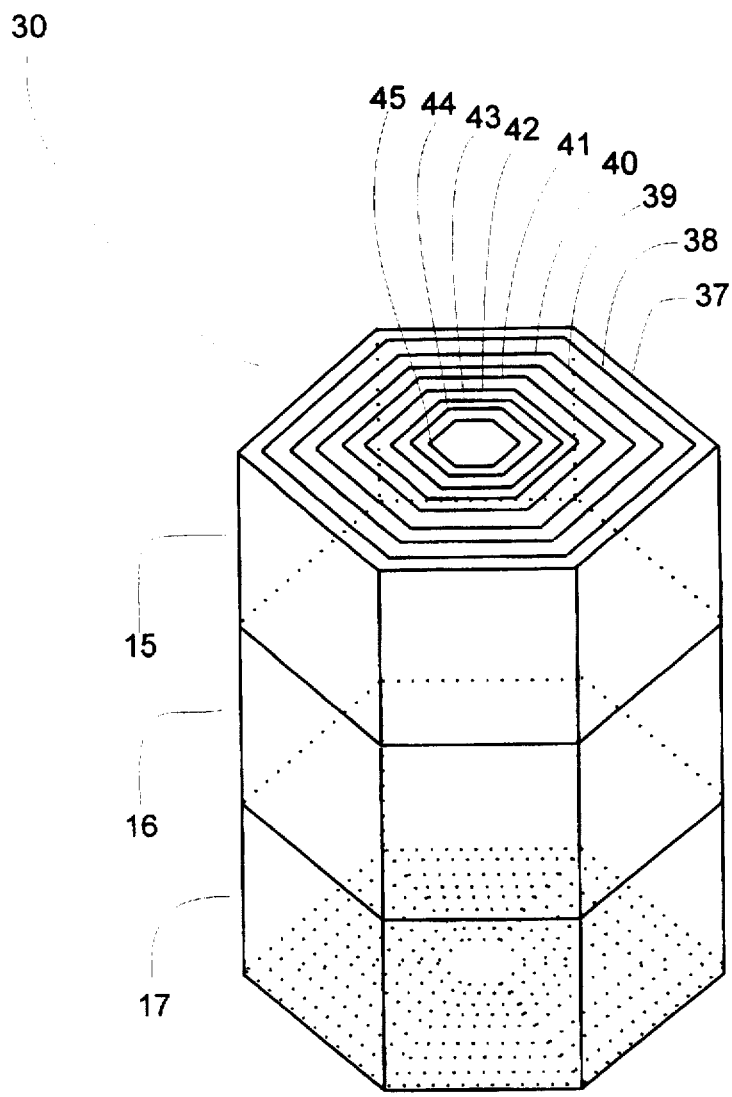
FIG. 14 depicts the three 3D n-gons of FIG. 10 or 11 is a single, layered 3D n-gon.
Figure 21:
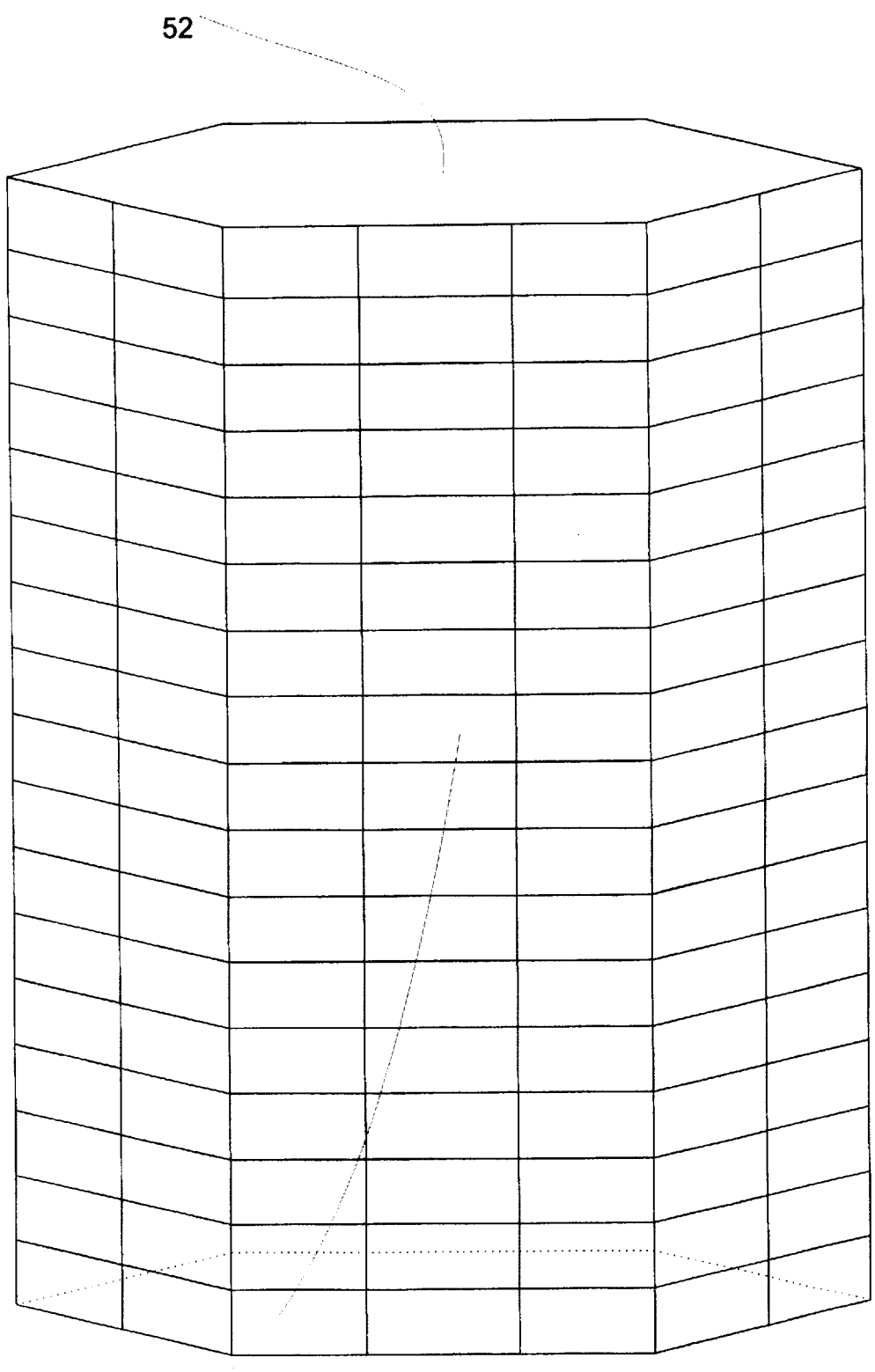
FIG. 21 shows the front face of the 3D, 6-gon of FIG. 20 having the values of the data associated with the front face displayed in a spreadsheet format.

After all the n-gon representation has been made, the GUI will display the exported n-gonal representation of the data structure shown illustratively in FIG. 10, or 13, or 14. The display n-gonal representation is then ready for navigation and data analysis, i.e., rotation around a symmetry axis, drill-down, drill-up, slice, dice, roll-up, roll-down, etc. Now the user can define spreadsheet-like relationships and/or formulae as shown in FIG. 5, and/or at various level(s) view the data in a spreadsheet format as shown in FIG. 21.

Step 5

Step 3 and 4 can be repeated till the user feels comfortable with the n-gon representation generated by the method of the present invention, i.e., by MAGIC.

Sample Problem

Suppose that the data categorized in the following tree definition is to be modeled:

Country
    America
    Japan
    Germany

Manufacturers
    American
        Yankee SportsWare
        American Sporting Goods
        Texan Sports
    Japanese
        Samurai Sports
        Nippon Sports Equipment
        Japanese Sporting Goods
    German
        Black Forest Games
        German Sports Equipment
        Munich Sports Type of rackets
    tennis
    squash
    racket ball Rackets details
    frame construction material
        aluminum
        wood
        graphite
    size
        small
        regular
        over-size
    weight
        light
        medium
        heavy
    string type
        animal gut
        synthetic
    grip type
        leather natural
        leather synthetic
        cloth natural
        cloth synthetic
    warranty
        6 month
        12 month
        18 month
    price Example of Advanced On-Line Analytical Processing (OLAP)

Suppose a buyer for a national sporting-goods retail company wants to purchase three types of racket: 1) tennis, 2) squash and 3) racket ball. The buyer needs to purchase various quantities of different types of rackets with various custom configurations from several possible manufacturer in different countries. Additionally, the buyer has to take into account the various incentives offered by some of the manufacturers, i.e., discount based on total amount of the purchase or total count of a particular type of racket. The buyer also has to factor in the current currency conversion rates and current import/export duties/tariffs.

Figure 22:
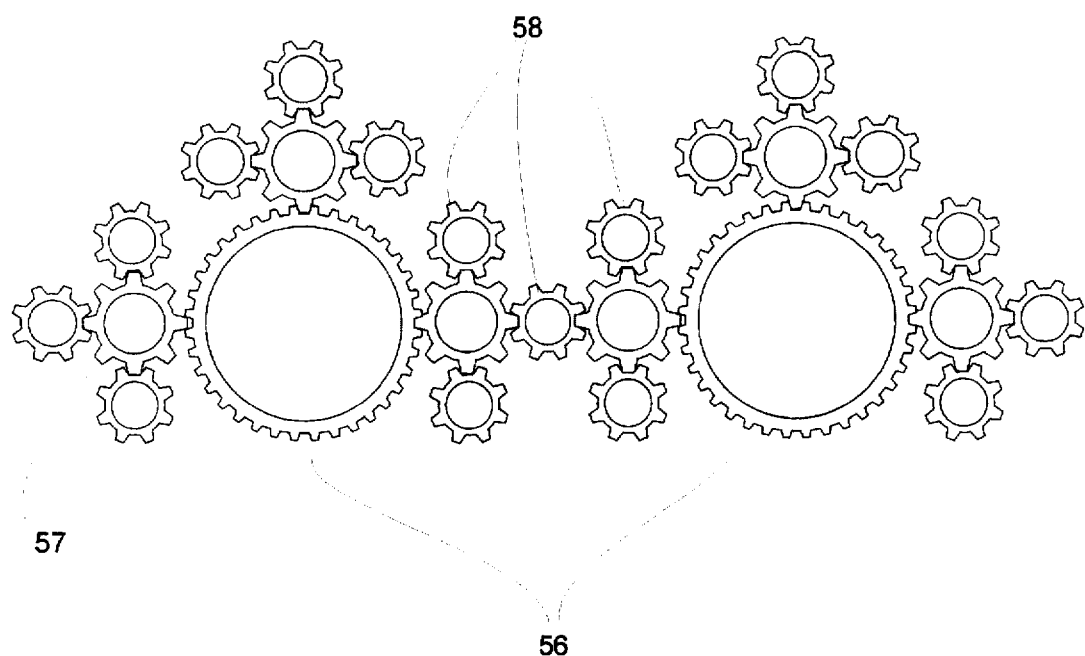
FIG. 22 shows relationships in gears (n-gons) format.

Ready to solve the above mentioned problem, the buyer starts MAGIC. After MAGIC is ready, the buyer will invoke the meta-data manager (MDM) (see FIG. 7) from either a menu, an icon or a key stoke(s). Next, the GUI or UI wizard will appear on the screen and guide the buyer through the multiple options of for schema selection. At each step, the buyer will make the choice(s) according to the perspective of the schema he wishes to see. Once all the selections have been made, the buyer will be given the choice of how he wishes to see the database schema layout. Some of the possible choices are: tree structure as shown in FIG. 15, entity-relation-diagram, gear structure as shown in FIG. 22, Venn diagram, list boxes, etc.

Figure 16:
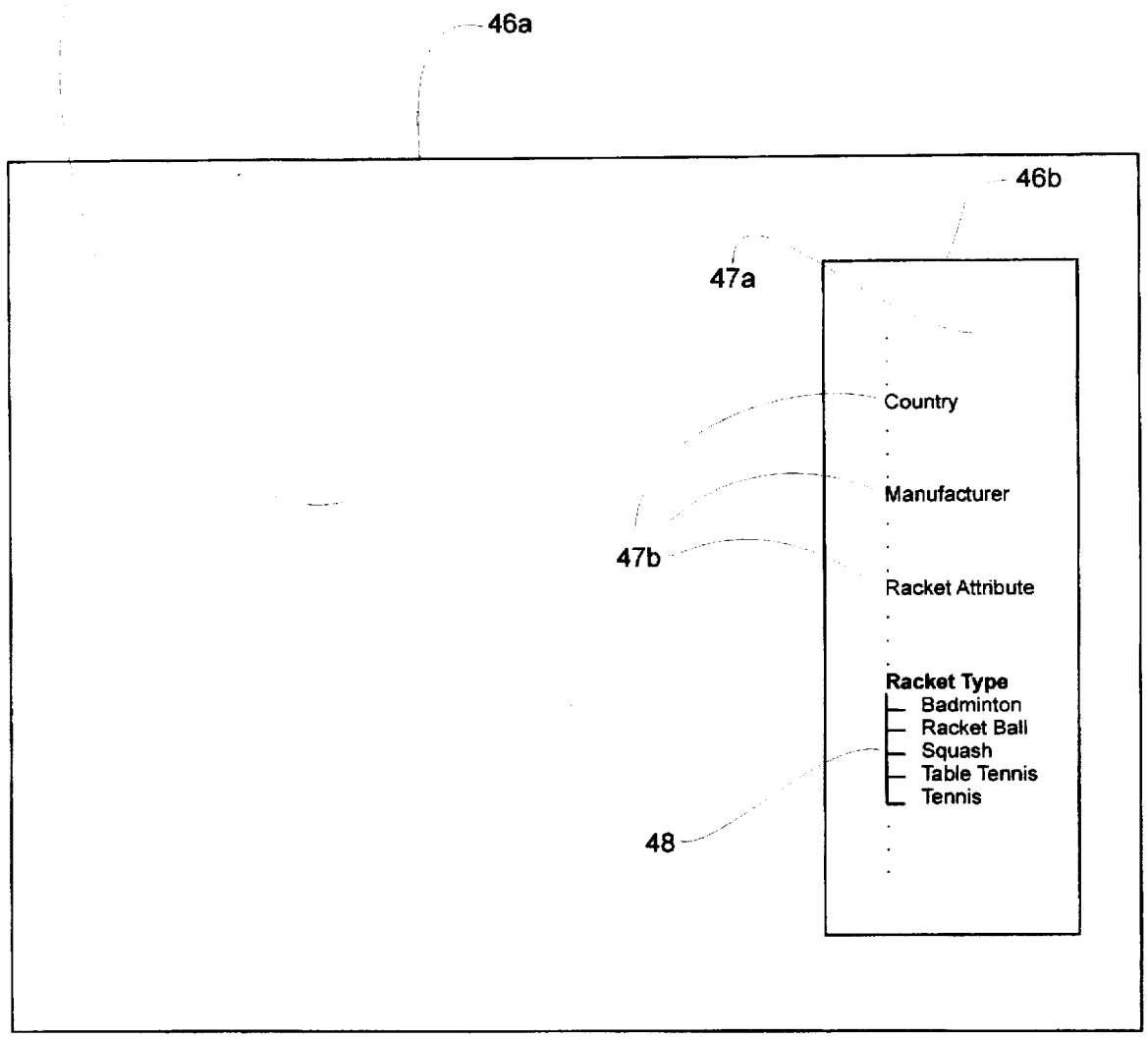
FIG. 16 depicts a second view of the user interface for extracting database schema information.

Referring to FIG. 15, the GUI displays a display window 46a on a display device (not shown). The display window 46a has a user selected schema structure 47a contained in a schema display area 46b. The user now wants to drill-down on a Racket Type field 47b in the database schema 47a to show the Racket Type data values 48 as shown in FIG. 16. This can be accomplished in a variety of ways, i.e., from a menu, an icon, double clicking on the Racket Type field 47b, right mouse click or appropriate keystrokes, etc.

The buyer/user now selects a Tennis item 48 from the database schema 47a, and drag-and-drops the Tennis item 48 onto a tree-definition area 129 of the display window 46a to form a tree definition 49. The system by default uses the item's name—Tennis—as it appears in the schema. Next, the buyer drag-and-drops Racket Attributes 47b on the tree-definition area 129 beneath the Tennis item 48 as shown in FIG. 18. At this time, the buyer defines a parent-child relationship 50 between the Tennis item 48 as a parent and the Racket Attributes 47b as a child. Subsequently, the buyer drag-and-drops a Manufacturer item 47b on the tree-definition area 129 beneath the Racket Attributes 47b. At this time, the buyer defines another parent-child relationship 50 this one between the Racket Attribute 47b as parent and the Manufacturer 47b as child. Lastly, the buyer drag-and-drops the Country item 47b on the tree-definition area 129 beneath the Manufacturer item 47b. At this time, the buyer defines another parent-child relationship 50 this one between the Manufacturer item 47b as parent and the Country item 47b as child.

The above mentioned steps are repeated for Squash as well as Racket Ball as shown in FIGS. 17–18.

Now, the buyer selects the Carrousel Controller (CC) from either a menu option, or from an icon, or by typing short-cut key strokes. The CC scans the tree-definition area 129, correlates the information with the MDM and displays a wizard to determine the display configuration(s) of the n-gon. Some of the possibilities are shown in FIG. 10, 13, or 14. The buyer makes a selection. CC passes this and other necessary information to Database Connectivity Engine (DCE).

The DCE obtains the information from the CC and correlates this information with the MDM. Next, the DCE interprets the request and dynamically prepares database commands to retrieve the data from the database so that the n-gon can be populated. (Database commands are generated at runtime to optimize performance.) Once the necessary database commands have been determined, the Query Estimate Agent (QEA) prepares the estimate of how long the query will take and how much data will be retrieved. This information is conveyed to the buyer via the UI or GUI. Assuming the QEA estimates are acceptable to the buyer and the buyer OKs the proposed action and the DCE generates the necessary commands and transmits them to the database and waits for the response.

When the data is transferred from the database back to the DCE, the DCE passes the data to the CC. The Selection Exception Agent (SEA) of the CC applies the necessary logic, tests, etc. to determine if the data satisfies the criteria selected by the buyer. Now the CC displays the data in an n-gonal representation as requested by the buyer.

Figure 11:
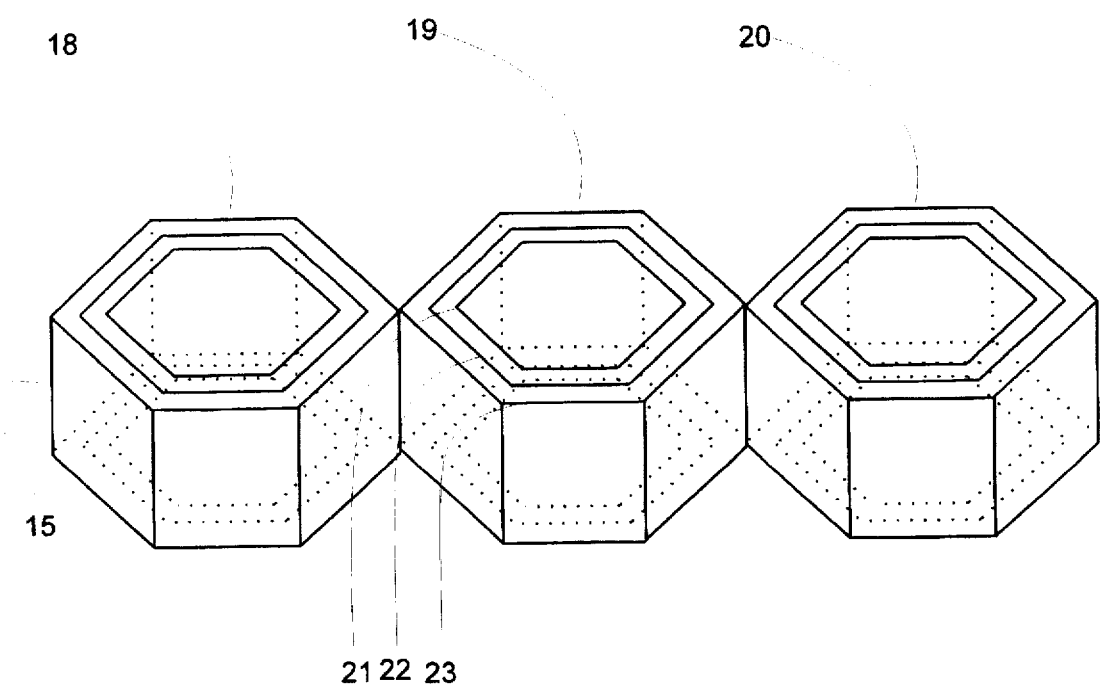
FIG. 11 depicts an alternate 3D representation of the 3D objects of FIG. 10 where the levels are shown as layers instead of levels as shown in FIG. 10.
Figure 12:
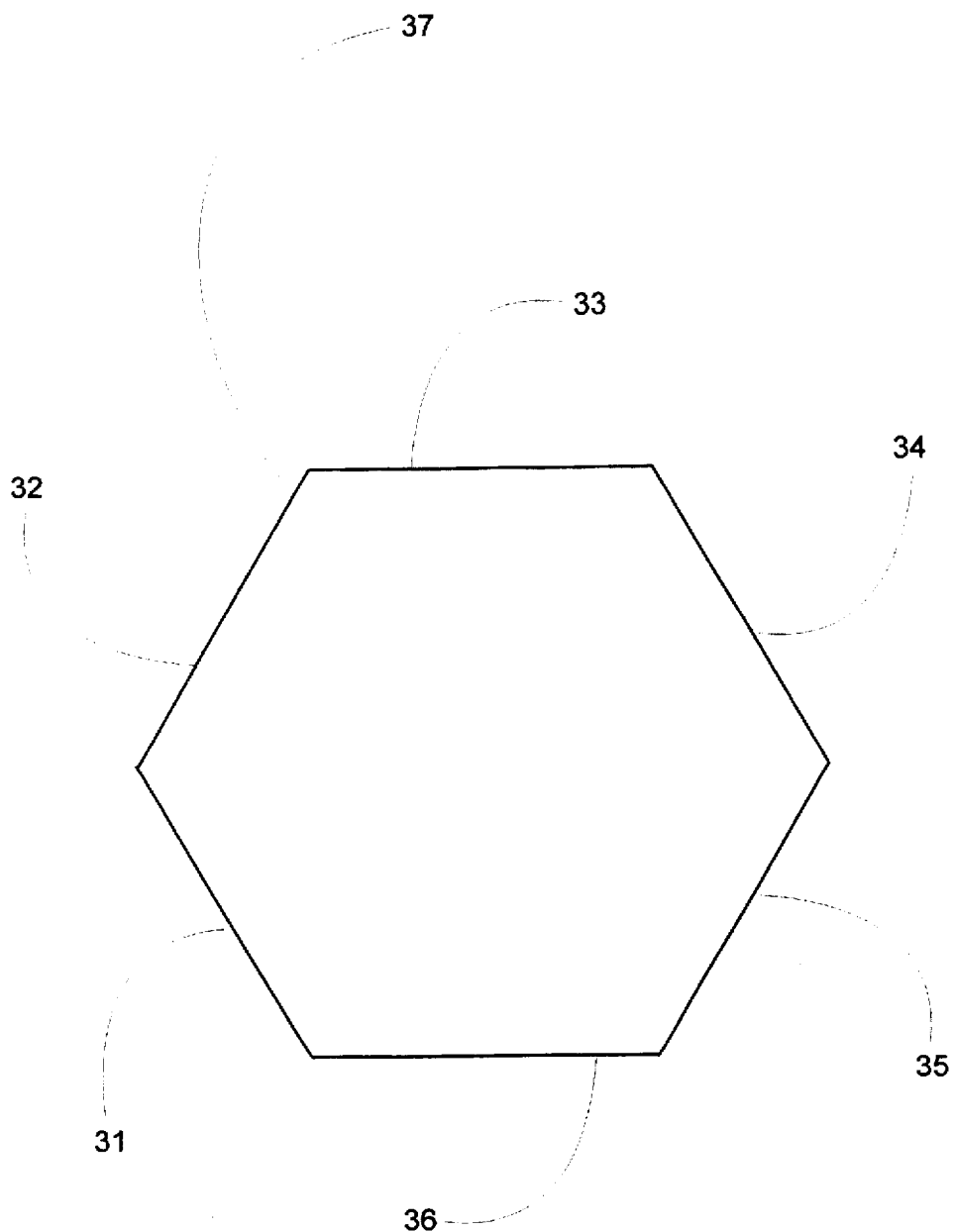
FIG. 12 depicts the attribute n-gon for each level of FIG. 10 or 11.

The buyer will see three n-gonal solids 18, 19, and 20 set side by side; one for each country and containing all associated data from the tree structure 49 as shown in FIG. 10. The first n-gonal solid 18 represents the Country America and its associated data; the second n-gonal solid 19 represents the Country Japan and its associated data; and the third solid 20 represents the Country Germany and its associated data. Each n-gonal solid 18,19,20 has six sides as shown in FIG. 12. Each side represents a Racket Attribute value: a string type 31, a frame construction material 32, a weight 33, a grip type 34, a warranty 35, and a size 36. Each n-gonal solid 18,19,20 comprises nine stacked sections which represent represents a manufacturers: Yankee SportsWare 21, American Sporting Goods 22, Texan Sports 23, Samurai Sports 24, Nippon Sports Equipment 25, Japanese Sporting Goods 26, Black Forest Games 27, German Sports Equipment 28, and Munich Sports 29. In each n-gonal solid 18,19,20, the first three sections represent Tennis 15, the next three sections represent Squash 16, and the last three sections represent Racket Ball 17. FIG. 11 is a second representation of the Tennis section 15 of the data of FIG. 10, except that the n-gonal solid 18,19,20 have been collapsed to a layered structure where each layer in FIG. 11 is a level in FIG. 10. FIG. 13 shows all of the tower structure of FIG. 10 collapsed to a layered structure.

The objects are placed or grouped according to some predetermined criteria either specified by the buyer or based on some defaults in CC.

The n-gons cell layout might look as follows:

gon1=America
gon2=Japan
gon3=Germany
gon1.1=gon2.1=gon3.1=Tennis
gon1.2=gon2.2=gon3.2=Squash
gon1.3=gon2.3=gon3.3=Racket Ball
gon1.1.1=gon2.1.1=gon3.1.1=Yankee SportsWare
gon1.1.2=gon2.1.2=gon3.1.2=American Sporting Goods
gon1.1.3=gon2.1.3=gon3.1.3=Texan Sports
gon1.2.1=gon2.2.1=gon3.2.1=Samurai Sports
gon1.2.2=gon2.2.2=gon3.2.2=Nippon Sports Equipment
gon1.2.3=gon2.2.3=gon3.2.3=Japanese Sporting Goods
gon1.3.1=gon2.3.1=gon3.3.1=Black Forest Games
gon1.3.2=gon2.3.2=gon3.3.2=German Sports Equipment
gon1.3.3=gon2.3.3=gon3.3.3=Munich Sports
gon1.x.face1=gon2.x.face1=gon3.x.face1=frame construction material
gon1.x.face2=gon2.x.face2=gon3.x.face2=size
gon1.x.face3=gon2.x.face3=gon3.x.face3=weight
gon1.x.face4=gon2.x.face4=gon3.x.face4=string type
gon1.x.face5=gon2.x.face5=gon3.x.face5=grip type
gon1.x.face6=gon2.x.face6=gon3.x.face6=warranty
gon1.x.face1.option3=graphite
gon1.x.face2.option2=regular
gon1.x.face3.option2=medium
gon1.x.face4.option2=synthetic
gon1.x.face5.option1=leather natural
gon1.x.face6.option3=18 month Now the buyer is ready to perform analyzes on the data using GUI or UI commands.

Analysis Scenario 1

In this analysis the buyer wants to determine the best price for the following Tennis racket configuration as a hexagon 37 as shown in FIG. 12 where:

| Attribute | Value | Element # |
| --- | --- | --- |
| frame construction material | graphite | 32 |
| size | regular | 36 |
| weight | medium | 33 |
| string type | synthetic | 31 |
| grip type | leather natural | 34 |
| warranty | month | 35 |

Figure 20:
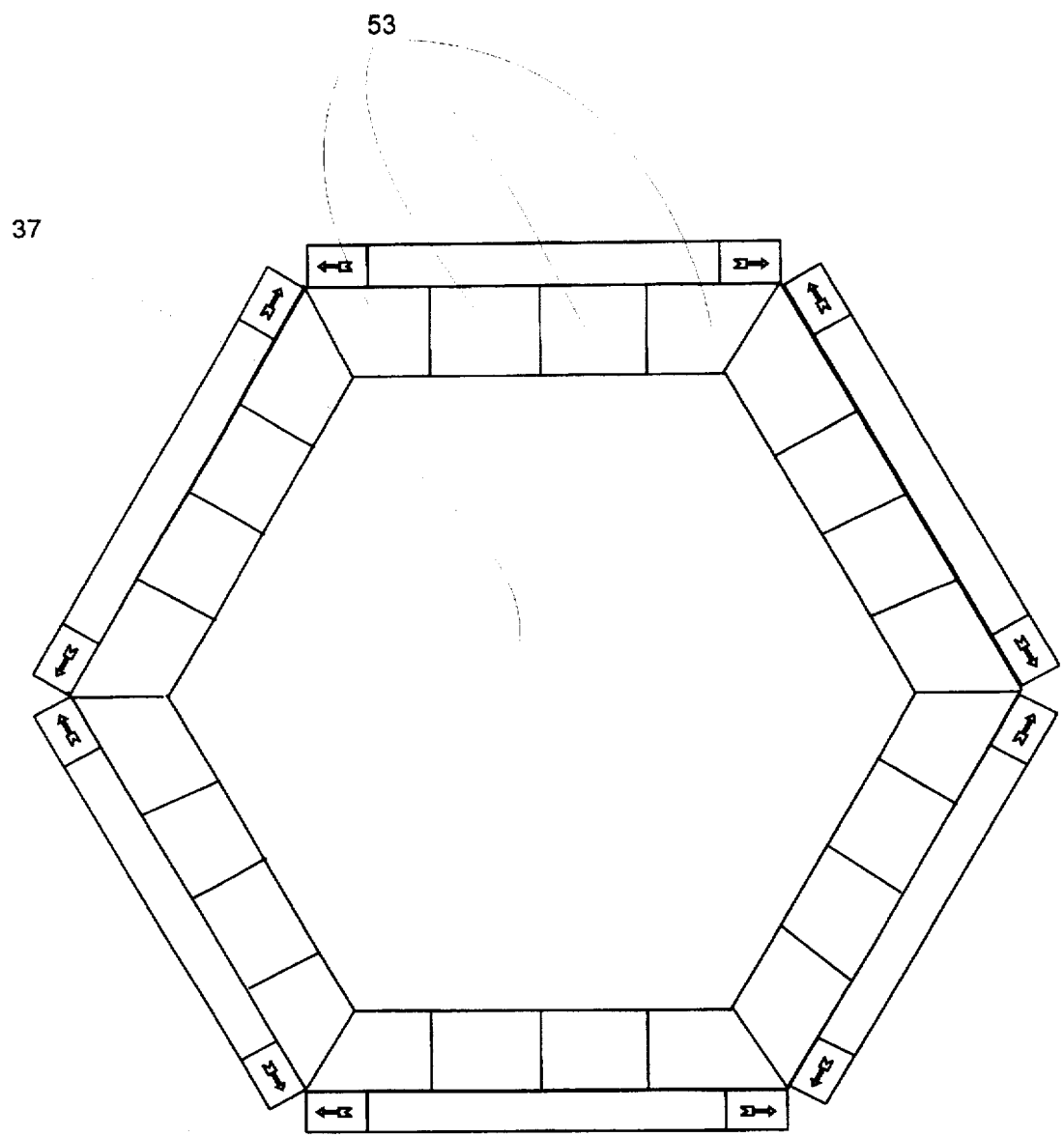
FIG. 20 is a top view of a hexagon or 6-gon having scroll-bars associated with each side of the hexagon for displaying the values of the data represented by each side.

Referring now to FIG. 20, one way to handle this situation is to view the Tennis n-gon 37 from the top. The buyer can scroll through the data values 53 associated with each side of the Tennis n-gon 37 using scroll bars 52 to select the desired values of the Racket Attribute. The buyer can then activate by mouse or keyboard selection using a UI or GUI Group Wizard (GW) to automatically ripple his selections throughout the entire Tennis n-gon.

As an example of group operation, the buyer with the help of a GW can, ripple an operation through all n-gons or any subset of n-gons, through all sections or any subsection, through all layers or any subset of layers, or any permutation of the n-gons, sections, or layers as desired.

An Operation Wizard (OW) of the CC allows the buyer to define a formula equal to the sum of the six sides of the n-gons shown in FIG. 11. The GW ripples, i.e., applies, this formula to all layers of the sections that represent Tennis, in the three n-gons. Next, using the OW, the buyer defines a sort operation that ripples, is applied, through the layers and promotes the layer with the least sum to the face of the n-gons and demotes the layer with the highest sum furthermost from the face of the n-gons. Hence, the outer layer of the section in the three n-gons now represents a Manufacturer in a Country that has the least expensive Tennis Racket with the desired configuration. The buyer can now save this state and give it an appropriate name.

Alternatively, the buyer can change the data representation through a set of reorganization commands using the CC to generate the n-gonal representation shown in FIG. 14. These commands can compress or decompress the n-gonal representation or rearrange the n-gonal representation. Now, instead of three n-gons the buyer sees only one n-gon 30. In this representation, the n-gon 30 has the three sections 15, 16, 17, representing the countries and nine layers 37, 38, 39, 40, 41, 42, 43, 44, and 45, representing the nine manufacturers for that type of racket.

The buyer can then invoke a function by double-clicking on the top section of the n-gon or clicking on the right mouse button to change the representation to a top view of the n-gon as shown in FIG. 20. The buyer scrolls through the data values using the scroll bars to select the desired values of the Racket Attribute for tennis. The buyer uses the UI GW commands to again automatically ripple his selections through all layers of the top section of the n-gon that represent the tennis manufacturers.

Again, the OW function of the CC allows the buyer to define a formula equal to the sum of the six sides of the n-gon. The GW ripples this formula through all layers of the top section in n-gon to display the tennis manufacturers. Next using the OW, the buyer defines a sort operation based on the previously defined formula. This sort operation is then rippled through the layers of the top section promoting the layer with the least sum to the face of the n-gon, and demoting the layer with the highest sum furthermost from the face of the n-gon. This enables the buyer to determine the least expensive tennis manufacturer amongst the nine manufacturers.

Next the buyer scrolls through the data values on each side of the hexagon and selects the desired values of the Racket Attribute for squash. The buyer can repeat the above mentioned process, thereby determining the least expensive squash manufacturer amongst the nine manufacturers.

By selecting the desired values of the Racket Attribute for racket ball and following the steps mentioned above, the buyer can determine the least expensive racket ball manufacturer among the nine manufacturers. Hence, the three sections of the n-gon, see FIG. 14, now display the manufacturers that have the least expensive prices for each type of racket.

By activating a multiplying function similar to the functions used in spreadsheets to define operations on row and columns, the quantity and price for each type of racket factoring in tariffs, discounts, etc. can be determine so that the least expensive and best resupply order can be filled. The buyer can then save this state giving it an appropriate name or by activating an order generation routine, generate the appropriate order form.

Let us assume that the three manufacturers that are shown on the face of the n-gon are all different. The buyer wants to determine the manufacturer with the least price. In other words the buyer wants to see the same manufacturer on the outermost layer of all three sections. Therefore, the buyer uses the OW function to define a formula equal to the sum of the six sides for each of three the sections of the n-gon. The GW ripples this formula through all layers (manufacturers) of the three sections in the n-gon—which represents all types of rackets and their manufacturers. Next using the OW function, the buyer defines a sort fiction based on the previously defined formula. This sort fiction ripples through all layers and all sections, and promotes a combination of layer(s) which represents a manufacturer with the least sum (price), to the face of the n-gon and demotes the combination of layer(s) that represent a manufacturer with the highest sum (price), furthermost from the face of the n-gon. This enables the buyer to determine the least and most expensive manufacturer from among the nine manufacturers.

Formula Definition Examples

The following is an illustrative example of a formula definition:

| | |
| --- | --- |
| gon1.section1.Yankee SportsWare.sum = | |
| gon1.section1.Yankee SportsWare.face1 + | /* frame const. material */ |
| gon1.section1.Yankee SportsWare.face2 + | /* size */ |
| gon1.section1.Yankee SportsWare.face3 + | /* weight */ |
| gon1.section1.Yankee SportsWare.face4 + | /* string type */ |
| gon1.section1.Yankee SportsWare.face5 + | /* grip type */ |
| gon1.section1.Yankee SportsWare.face6 + | /* warranty */ |
| gon1.section1.American Sporting Goods.sum = | |
| gon1.section1.American Sporting Goods.face1 + | /* frame const. material */ |
| gon1.section1.American Sporting Goods.face2 + | /* size */ |
| gon1.section1.American Sporting Goods.face3 + | /* weight */ |
| gon1.section1.American Sporting Goods.face4 + | /* string type */ |
| gon1.section1.American Sporting Goods.face5 + | /* grip type */ |
| gon1.section1.American Sporting Goods.face6 + | /* warranty */ |
| gon1.section1.Texan Sports.sum = | |
| gon1.section1.Texan Sports.face1 + | /* frame const. material */ |
| gon1.section1.Texan Sports.face2 + | /* size */ |
| gon1.section1.Texan Sports.face3 + | /* weight */ |
| gon1.section1.Texan Sports.face4 + | /* string type */ |
| gon1.section1.Texan Sports.face5 + | /* grip type */ |
| gon1.section1.Texan Sports.face6 + | /* warranty */ |
| gon1.section1. Samurai Sports.sum = | |
| gon1.section1.Samurai Sports Sports.face1 + | /* frame const. material */ |
| gon1.section1.Samurai Sports Sports.face2 + | /* size */ |

| | |
|---|---|
| gon1.section1.Samurai Sports Sports.face3 + | /* weight */ |
| gon1.section1.Samurai Sports Sports.face4 + | /* string type */ |
| gon1.section1.Samurai Sports Sports.face5 + | /* grip type */ |
| gon1.section1.Samurai Sports Sports.face6 + | /* warranty */ |
| gon1.section1. Nippon Sports Equipment.sum = | |
| gon1.section1.Nippon Sports Equipment.face1 + | /* frame const. material */ |
| gon1.section1.Nippon Sports Equipment.face2 + | /* size */ |
| gon1.section1.Nippon Sports Equipment.face3 + | /* weight */ |
| gon1.section1.Nippon Sports Equipment.face4 + | /* string type */ |
| gon1.section1.Nippon Sports Equipment.face5 + | /* warranty */ |
| gon1.section1. Japanese Sporting Goods.sum = | |
| gon1.section1.Japanese Sporting Goods.face1 + | /* frame const. material */ |
| gon1.section1.Japanese Sporting Goods.face2 + | /* size */ |
| gon1.section1.Japanese Sporting Goods.face3 + | /* weight */ |
| gon1.section1.Japanese Sporting Goods.face4 + | /* string type */ |
| gon1.section1.Japanese Sporting Goods.face5 + | /* grip type */ |
| gon1.section1.Japanese Sporting Goods.face6 + | /* warranty */ |
| gon1.section1. Black Forest Games.sum = | |
| gon1.section1.Black Forest Games.face1 + | /* frame const. material */ |
| gon1.section1.Black Forest Games.face2 + | /* size */ |
| gon1.section1.Black Forest Games.face3 + | /* weight */ |
| gon1.section1.Black Forest Games.face4 + | /* string type */ |
| gon1.section1.Black Forest Games.face5 + | /* grip type */ |
| gon1.section1.Black Forest Games.face6 + | /* warranty */ |
| gon1.section1. German Sports Equipment.sum = | |
| gon1.section1.German Sports Equipment.face1 + | /* frame const. material */ |
| gon1.section1.German Sports Equipment.face2 + | /* size */ |
| gon1.section1.German Sports Equipment.face3 + | /* weight */ |
| gon1.section1.German Sports Equipment.face4 + | /* string type */ |
| gon1.section1.German Sports Equipment.face5 + | /* grip type */ |
| gon1.section1.German Sports Equipment.face6 + | /* warranty */ |
| gon1.section1. Munich Sports.sum = | |
| gon1.section1.Munich Sports.face1 + | /* frame const. material */ |
| gon1.section1.Munich Sports.face2 + | /* size */ |
| gon1.section1.Munich Sports.face3 + | /* weight */ |
| gon1.section1.Munich Sports.face4 + | /* string type */ |
| gon1.section1.Munich Sports.face5 + | /* grip type */ |
| gon1.section1.Munich Sports.face6 + | /* warranty */ |

At this time buyer can factor in currency exchange rates, tariffs, etc., e.g.

```
gon1.section1.Japanese Sporting Goods =
  gon1.section1.Japanese Sporting Goods.sum*currency exchange
  rate*current tariff
```

Group operations are one strength of the multi-dimensional analysis system of this invention. These operations, which can appear as icons in the display window in the form of a tool or power bar or in any other operational display format. Therefore, the buyer does not have to individually define all of the above formula or relationships, instead the buyer defines the basic or the atomic relationships and then propagates them through the groups of related data values. Similarly, formula can be defined for gon1.section2 and gon1.section3 and then propagated through their respective groups. The group operation feature saves the buyer the trouble of defining each formula explicitly.

The buyer now wishes to see this information in a spreadsheet format. So the buyer invokes the Spreadsheet Manager (SM). SM formats the data and invokes the spreadsheet of choice.

Analysis Scenario 2

For the second example of the use of MAGIC, the buyer goes back to the meta-data manager (MDM). A UI or GUI wizard appears in the display screen and steps the buyer through a selection menu or question answer session to determine how the buyer wishes to see the database schema in an n-gonal representation. Let us assume the buyer selects the tree structure 47a shown in FIG. 19.

The buyer now decides to arrange the Countries, Racket Types and Manufacturers at the same level 51. Now suppose the buyer wants to define a parent-child relationship 50 between the Racket Attributes item a child and the Racket Types item as parent, the buyer simply drags-and-drops the Racket Types item into the tree-definition area 129 and defines the parent child relationship50 by forming a downward arrow from the Racket Attributes item to the Racket Types item using the icon operators associated with a tool or power bar. This buyer's final tree-definition is shown in FIG. 19.

Figure 23:
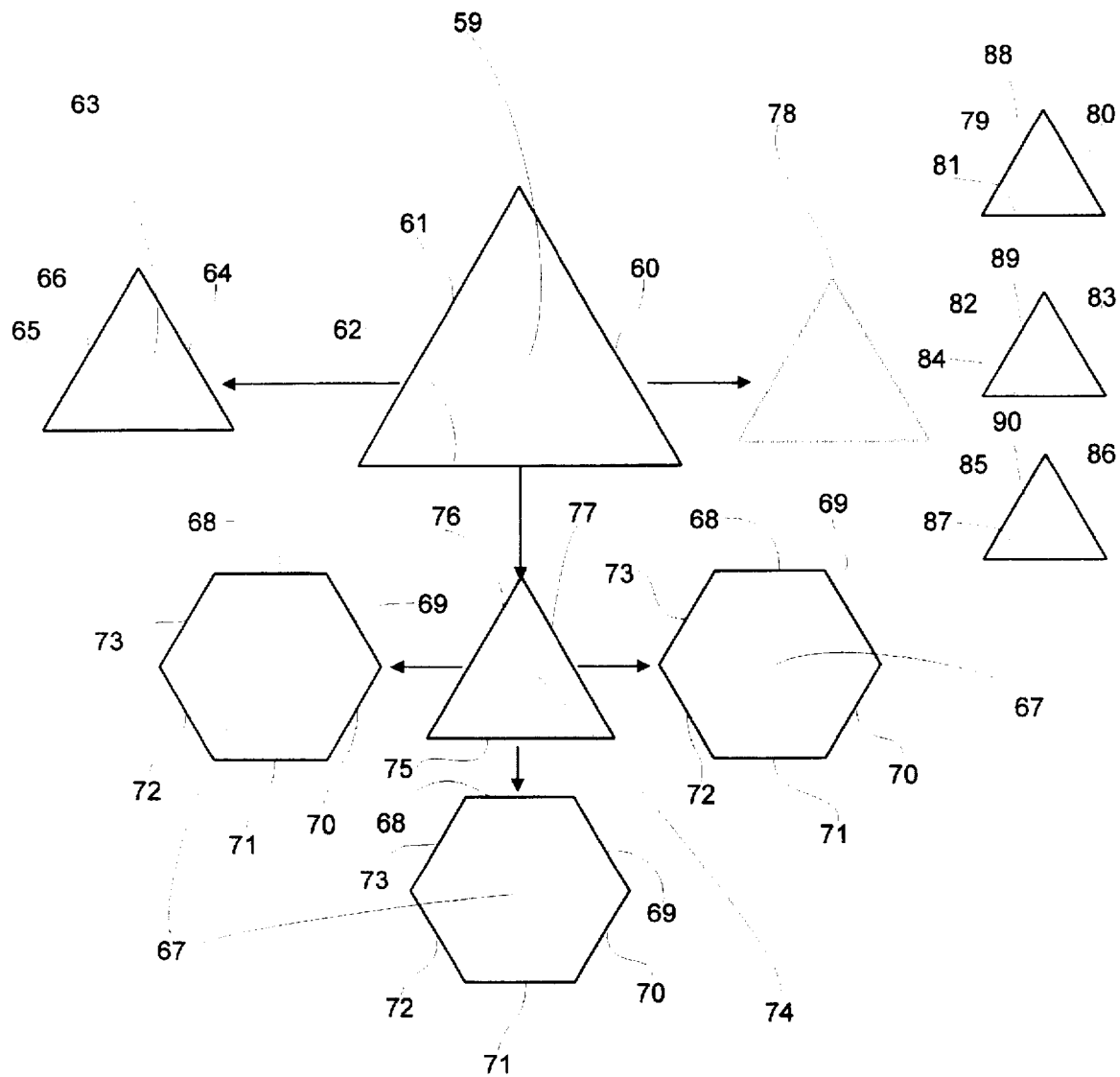
FIG. 23 depicts one entire data relationship showing all levels and the dimensionality of each level of data displayed as a plurality of n-gons.
Figure 24:
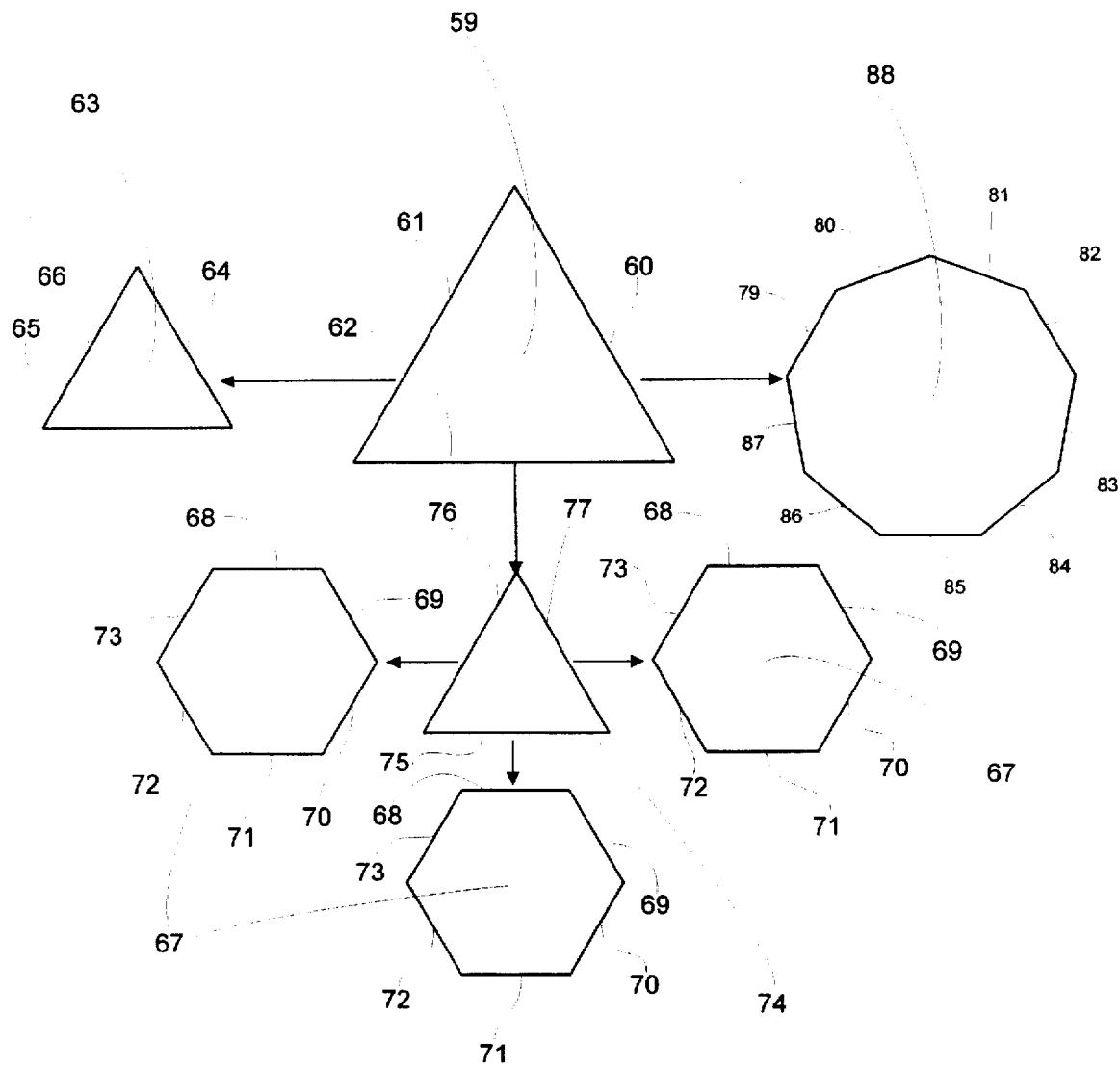
FIG. 24 depicts a second entire data relationship showing all levels and the dimensionality of each level of data displayed as a plurality of n-gons.
Figure 25:
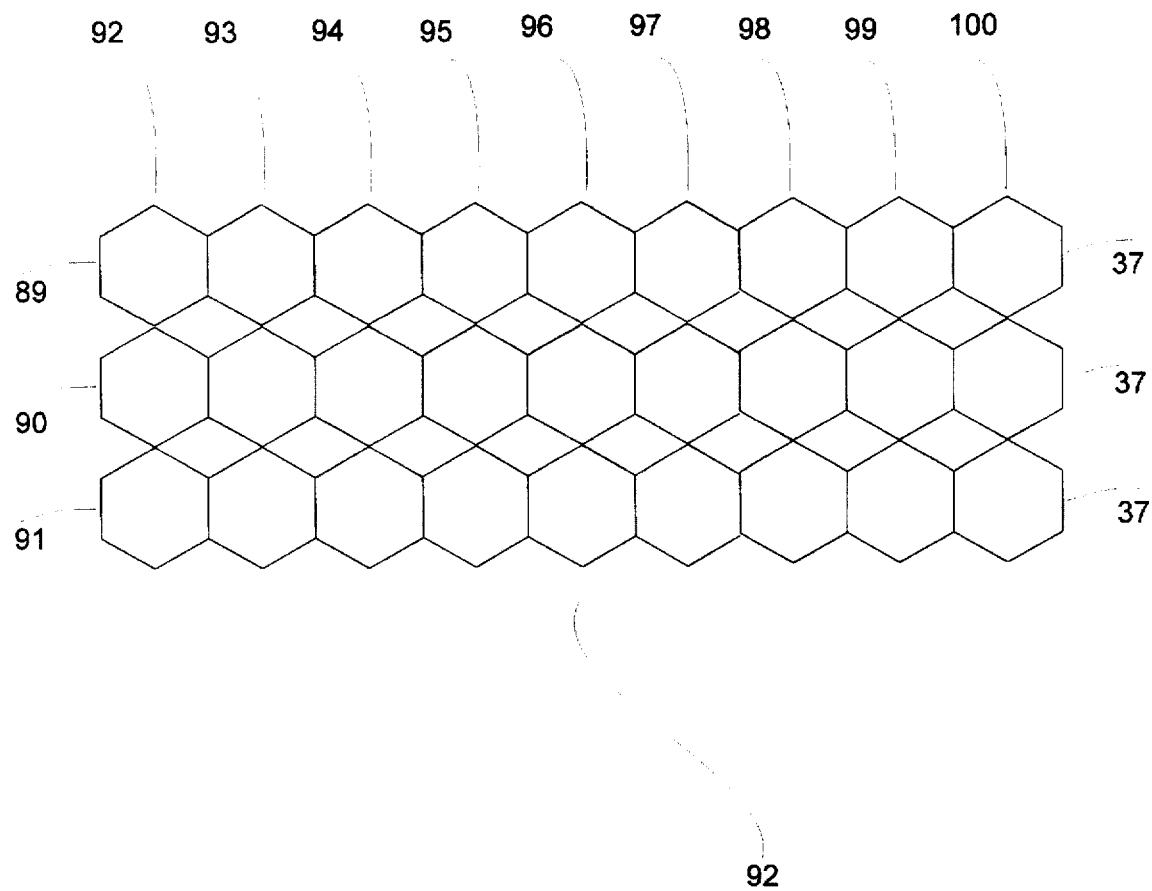
FIGS. 25 and 26 show a n-gon based spreadsheet display format horizontally and vertically depicted, respectively.

Now the buyer selects the Carrousel Controller (CC). The CC scans the tree-definition area 129, obtains the desired information using the MDM as shown in FIG. 7 and activates a wizard to determine the display configuration(s) of the n-gon. Several possible n-gonal representations of the selected tree-definitions are shown in FIG. 23, 24, or 25. The buyer selects the representation shown in FIG. 23. The CC passes this and other necessary information to the Database Connectivity Engine (DCE).

The interesting point to note is that not all permutations of Country and Manufacturers exist. In other words, if the Country selected is America 64, then the only possible manufacturers are 1) Yankee SportsWare 79, 2) American Sporting Goods 80, and 3) Texan Sports 81. Likewise if Yankee SportsWare 79 is chosen, then America 64 is the only valid Country. The CC is aware of these data relationships from the information contained in the MDM.

The buyer can then navigate, manipulate, perform operations, and define relationships and formula on the data or data groups through the UI or GUI of MAGIC as described in Analysis Scenario 1 until the necessary data is retrieved and from the database.

Now the CC in conjunction with the GUI displays the data as requested by the buyer. The buyer will see a three-sided n-gon 59 (triangle): one side represents a Country item 61; one side represents a Racket Types item 62; and one side represents a Manufacturers item 60. But because each item 60,61,62 are multi-valued data items, each side of triangle 59 is an n-gon of the appropriate dimensionality of the data.

The buyer can rotate the n-gon 59 to place the n-gon 59 in an appropriate orientation to be about to view a given side. Then the buyer can then activate a procedure to display all related n-gons associated with each side of n-gon 59. The Country item 61 is displayed as an n-gon 63 of the dimensionality of the Country item 61. If the buyer selects the Country America 64, the CC can be configured highlight a n-gon 88 of America manufacturers 79, 80, 81 and/or to eliminate or gray out all non-American manufacturers n-gons 89 and 90. Next, the buyer selects the face of the n-gon 59 that represents the Manufacturers item 61. The buyer is presented with only the valid manufacturers 78 for the country 64 already selected (an example of set theory operation—intersection of America and manufacturers). The rest of the selections are either grayed-out or not displayed. The option to gray-out or no-display can be set buyer the user in the option menus associated with the CC and can be changed whenever desired.

Next the buyer rotates the n-gon 59 till the face that represents the Racket Type 62 is in view. The buyer double-clicks on the Tennis face 76 and an n-gon 74 and the display creates n-gon 67 that represents Racket Attributes. The buyer rotates the child—Racket Attributes—n-gon and makes the desired selection(s).

In summary, the buyer has decided to view the manufacturers in America, the make of tennis rackets, and the desired racket attributes. Now the buyer can perform the necessary analysis.

The buyer now wishes to see this information in a spreadsheet form. So the buyer invokes the Spreadsheet Manager (SM). The SM formats the data and invokes the spreadsheet of choice. The SM used well known techniques for display in the appropriate spread sheet in the active graphics display window.

Analysis Scenario 3

Yet another way the buyer can perform the desired analysis is to view the necessary data in a spreadsheet-like format. In other words, the CC has to tessellate the screen with n-gons in a spreadsheet-like manner see FIGS. 25, 26, and 27. The major difference in spreadsheet and MAGIC is that, a cell in a typical spreadsheet is four-sided (rectangular in 2D space, cube in 3D space), thus only a limited number of variables can influence the value of the cell. But in the case of MAGIC, the number of sides of a cell is limitless (polygon in 2D space, polyhedra in 3D space) and is limited only by the number of variables that need to be expressed—one side for each variable. Thus, infinite number of variables can influence the value of the cell.

Figure 26:
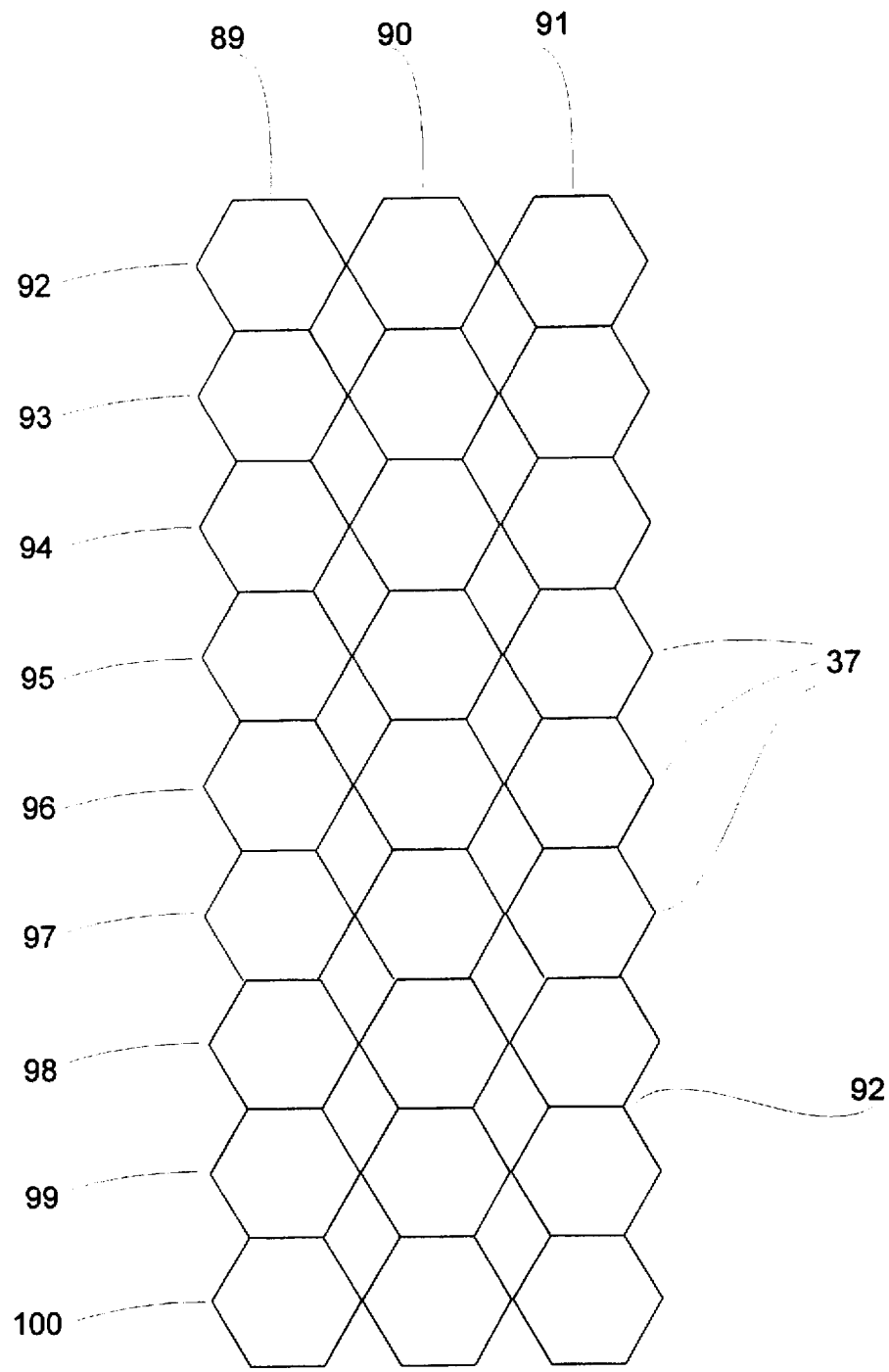
Figure 27:
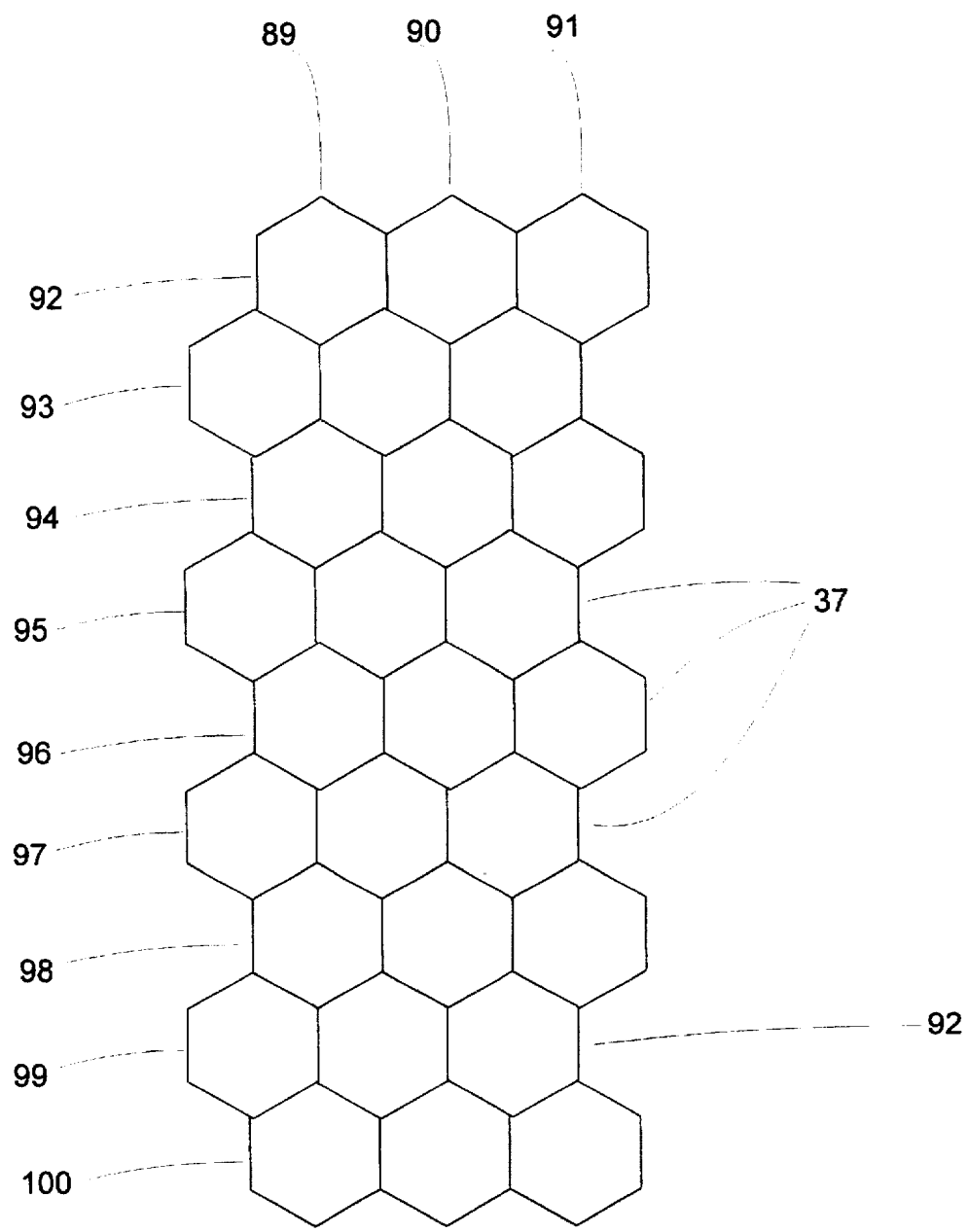
FIG. 27 shows an alternate based spreadsheet display format for multi-dimensional data objects.

In a typical spreadsheet, the value of a cell is influenced and limited by, 1) row—x-axis, 2) column—y-axis, and 3) the depth—z-axis. In MAGIC the value of a cell is influenced by the side of the n-gon—virtually limitless. As shown in FIGS. 25–27 the n-gons 37 are arranged in a tessellated structure 92 which can be horizontally or vertically oriented with the hexagons intersecting at two faces and two vertices in the center or oriented so that all faces of interior hexagons are coincident. Section 89–90 represent horizontal sections in FIG. 25 and vertical sections in FIGS. 26 and 27. Sections 92–100 represent vertical section is FIG. 25 and horizontal sections in FIGS. 26 and 27.

Meta-Data Manager (MDM)

MDM see FIG. 7, provides a semantic bridge between logical database schema and the physical database schema. MDM has a Schema Synchronization Agent (SSA) that keeps the logical schema synchronized with the physical schema. The fiction of the Meta-data Manager is to furnish information about the data. In other words, the MDM explains the layout of data repositories such as files, spreadsheets, relational databases, object oriented databases, legacy databases, etc. The MDM operates by communicating with database manager, reading the data dictionaries, matching the foreign keys, extracting the join information, or by reading spreadsheet and files, etc. Once the information has been imported or read in, name conflicts are resolved, cryptic names are simplified, and then the information is stored in a database associated with the MDM as shown in FIG. 7. The user of the tool has to identify a data source to MDM that the user is interested in to be included in the MDM associated database. MDM proceeds to import and store the pertinent data. Once the information has been imported in the MDM it can then be used to identify the data the user wants to work with.

A Translation Agent (TA) translates or transforms the cryptic database names to a user understandable business name. The MDM then passes this information to User Interface (UI) so that the schema may be shown to the user in the form of a list-box, tree, dialog-box, an user specified form, etc. The display and selection format choice is handled by a UI wizard. The MDM is capable of mapping data from different and/or multiple databases and organizing the information as a consolidated schema which can be displayed by the UI.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

User Interface

The user interface is a component that controls, responds, and reacts to user actions and requests. The user interface acts as an intermediary between the user and the other components of the system such as MDM, Tree Definition Area, Carrousel Controller, etc. The user interface is context sensitive in the sense that it knows what the user is working with or what is currently active, it then proceeds to display the appropriate information. The user interface also interacts with the operating system to paint, redraw, interpret mouse and keyboard actions, etc. The UI can also be or include a GUI which contains a complete set of routines for the display and manipulation of 2D and 3D objects on a display device. The routines include standard line drawing, polygon drawing, fill routines, shaping routines, scaling routines, view port routines, window routines, rotation and geometrical modification routines, template routines, and other routine included in graphics software products such as Harvard Graphics, Visio, or other similar graphics routines.

Tree Definition Area

Tree definition area is like a palette where the user formulates the abstract that the user is interested in. For example, as the necessary selections are made from MDM they are dropped on the Tree Definition Area, hence the parent-child relationship or a sibling relationship can be defined. As an object is dropped on the TDA, the MDM is queried about the attributes of the object, and this information is saved. All subsequent actions on the object(s) are also saved, i.e., parent-child definitions, sibling definitions, etc. When the user completes a transaction this information is passed to the Carrousel Controller so that it may determine how to render the n-gonal representation.

Carrousel Controller

The main fiction of a Carrousel Controller is to obtain input from a source such as TDA and then represent this information with appropriate n-gons. The CC can be driven either in manual, semi-manual or completely automated mode. In the manual mode the user specifies exactly what the CC needs to do, the semi-manual mode is accomplished by using wizard technology, and the completely automated mode is accomplished by allowing CC to make all the choices itself. Although, the user can still make changes to the automatically generated model.

Database Connectivity Engine

The Database Connectivity Engine (DCE) performs the task of formulating the user's request and retrieving the necessary data from the database. The DCE retrieves data by either issuing SQL commands or by using an ODBC interface. For example, as the user selects and refines the data that the user is after, this is translated to 'select' or 'where' SQL clauses. In other words DCE simply generates scripts that database managers can understand.

Example of Automated N-Gon Generation

In this example the functionality of a File Manager (a la Microsoft Windows 3.x operating system) or Explorer (a la Microsoft Windows 95) is duplicated.

The user either from a menu, button, keyboard shortcut, mouse right click, etc. indicated that the user desires to automatically generate an n-gon representation of a disk drive structure with directories, subdirectories and files.

Figure 37:
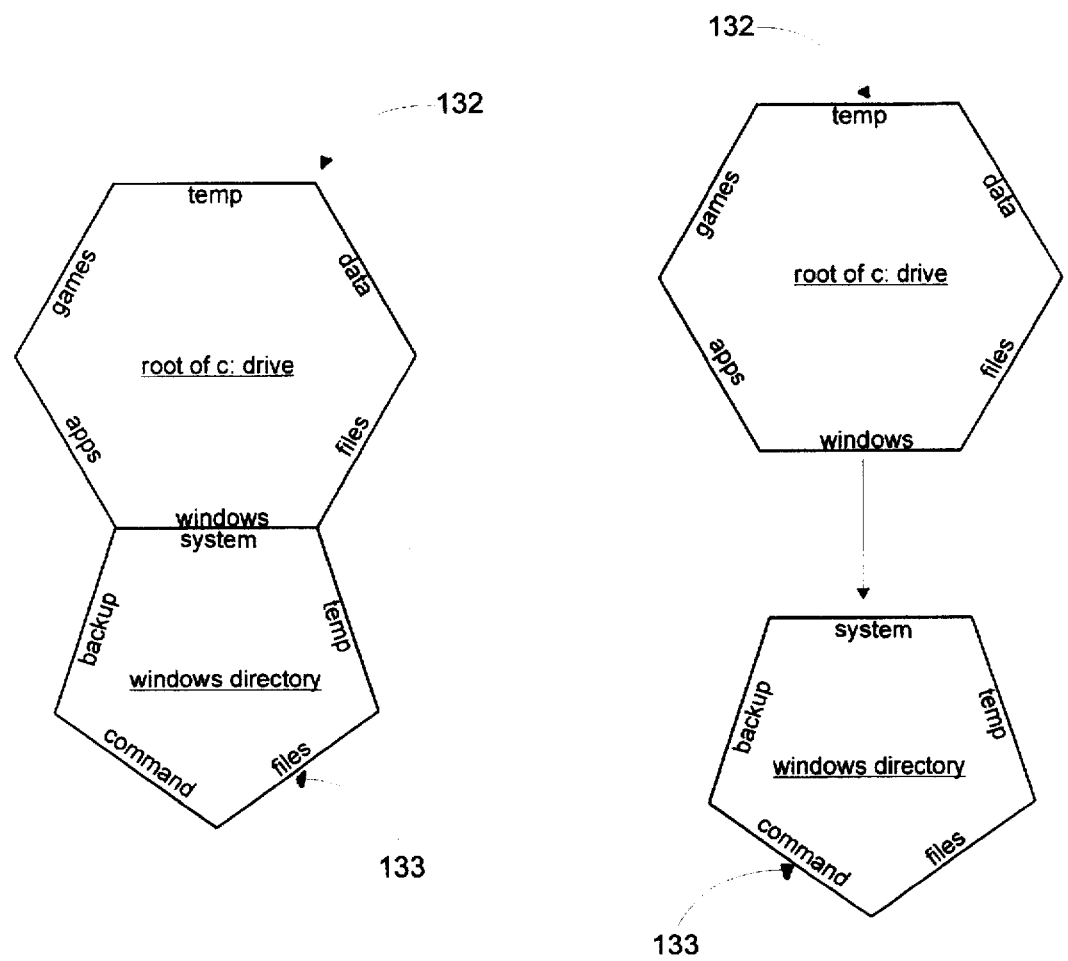
FIG. 37 depicts an n-gonal representation of the directory and file structure of a disk drive c.

Following this command MAGIC reads the directory structure starting from the root c:\. Now the root can contain files and directories. If an entry in the root is a file, then we have reached the leaf level. If an entry is a directory, then we have a parent-child relationship between the root and the first level of subdirectories. Then the subdirectories have to be drilled-down to obtain additional structure. Let the following be the list of subdirectories contained in the root: \apps; \data; \games; \temp; and \windows. In addition to the directories there are eighteen files in the root. Thus, we can describe this situation with a 6-gon or hexagon. Five sides represent subdirectories and the other side represents a files which shows eighteen levels or layers. One n-gonal representation of the root directories n-gon 132 and the associated subdirectories of the windows directory n-gon 133 is shown in FIG. 37, which depicts the directory structure in associated and dissociated views. Of course, the files could be represented by a multi-sided object corresponding to the extension of the files.

Figure 38:
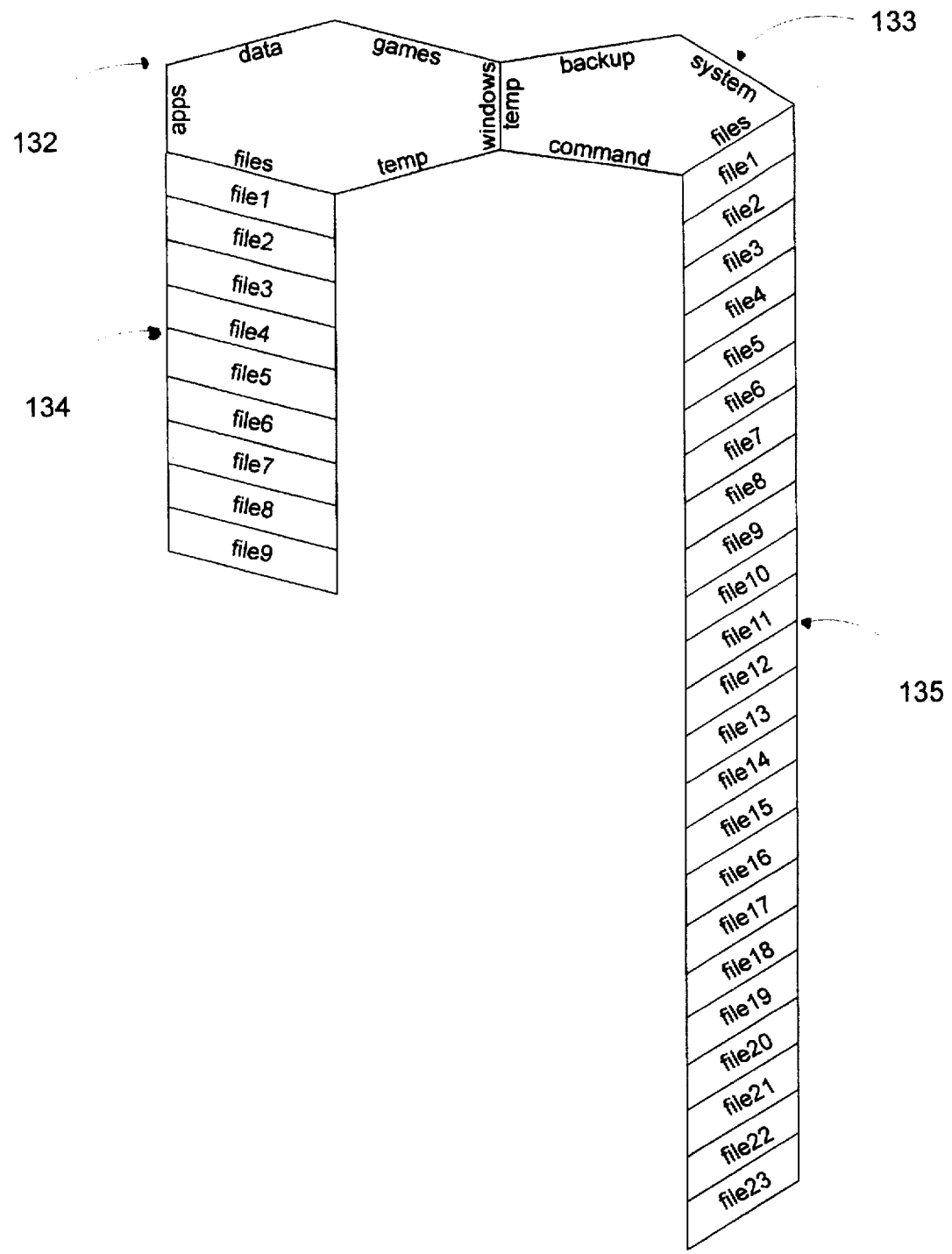
FIG. 38 depicts a second n-gonal representation of the directory and file structure of the drive of FIG. 37.

Suppose the \windows directory includes four subdirectories: \system; \temp\; \command, and\backup and ninety seven files. Now the \windows directory is the parent and the other four directories are children. This situation can be described with a five sided n-gon (pentagon), four sides to represent directories, and one side to represent the files. In this case, the side that represents the files will have ninety seven layers or levels, to correspond with the ninety seven files. In the event, MAGIC cannot show all ninety seven files at the same time, it will provide scroll bars so that the user can scroll up or down through the files. Again, the files could be represented by a multi-sided object corresponding to the extension of the files. The directory structure and associated files within the directories are shown in a n-gonal representation in FIG. 38 where hexagon 132 includes the top level directories and pentagon 133 represents the windows sub-directories. Extending downward from n-gon 132 and 133 are the associated files 134 and 135 in the files directories of n-gon 132 and the files sub-directory of n-gon 133.

Hence, following the above mentioned methodology all directories and subdirectories of a disk drive structure can be represented with n-gons.

Suppose a user wants to create a new subdirectory in the root call \demo. The user can accomplish this by activating the root n-gon (perhaps by right mouse click) and then by selecting 'new folder' and providing the name 'demo' with these actions the user has requested the creation of a new subdirectory. MAGIC responds by increasing the number of sides of the root by one, i.e., from a hexagon to a heptagon. The new side is named 'demo'.

Suppose a user wants to search for files of the type *.doc in the entire disk drive. MAGIC can respond to this request in two ways, in the first scenario it can display the entire geometry and color code the hits (if any). In the second scenario, it can reduce the geometry and only show the hits.

Helical or Spiral Representations

A helix is a 3D format for representing periodic or semi-periodic data such as data which is generated daily, hourly, weekly, monthly, yearly, etc. A spiral is another format for representing periodic or semi-periodic data.

Suppose in the city of Houston and the city of Dallas the ambient temperature is recorded every hour of the day, every day of the year. Since there are 24 hours in a day, we can define a 24 sided polygon to represent the temperature of every hour of the day, where each side of the polygon will represent a reading taken that hour. To represent data for one year, we define a column of 365 24-sided polygons, where all polygons are connected to each other to form a helix.

Hence, one day's data will be represented by one revolution of the helix, one year's data will be represented by a helix that includes a ring of 365 sides each side being a 24-sided polygon. To perform comparisons between Houston and Dallas ambient temperature measurements, we represent the temperatures as two helices one representing Houston and one representing Dallas temperatures. As we look at the sides of the two helices that represent 9 am, we can observe the temperature for the entire year both in Houston and Dallas. If we rotate the helices clockwise or counterclockwise, we can observe the readings for either 8 am or 10 am.

It should be evident from the above example that a helix structure can be used to represent enormous amounts of data (24×365×2=17,520 readings) on one screen.

Figure 36:
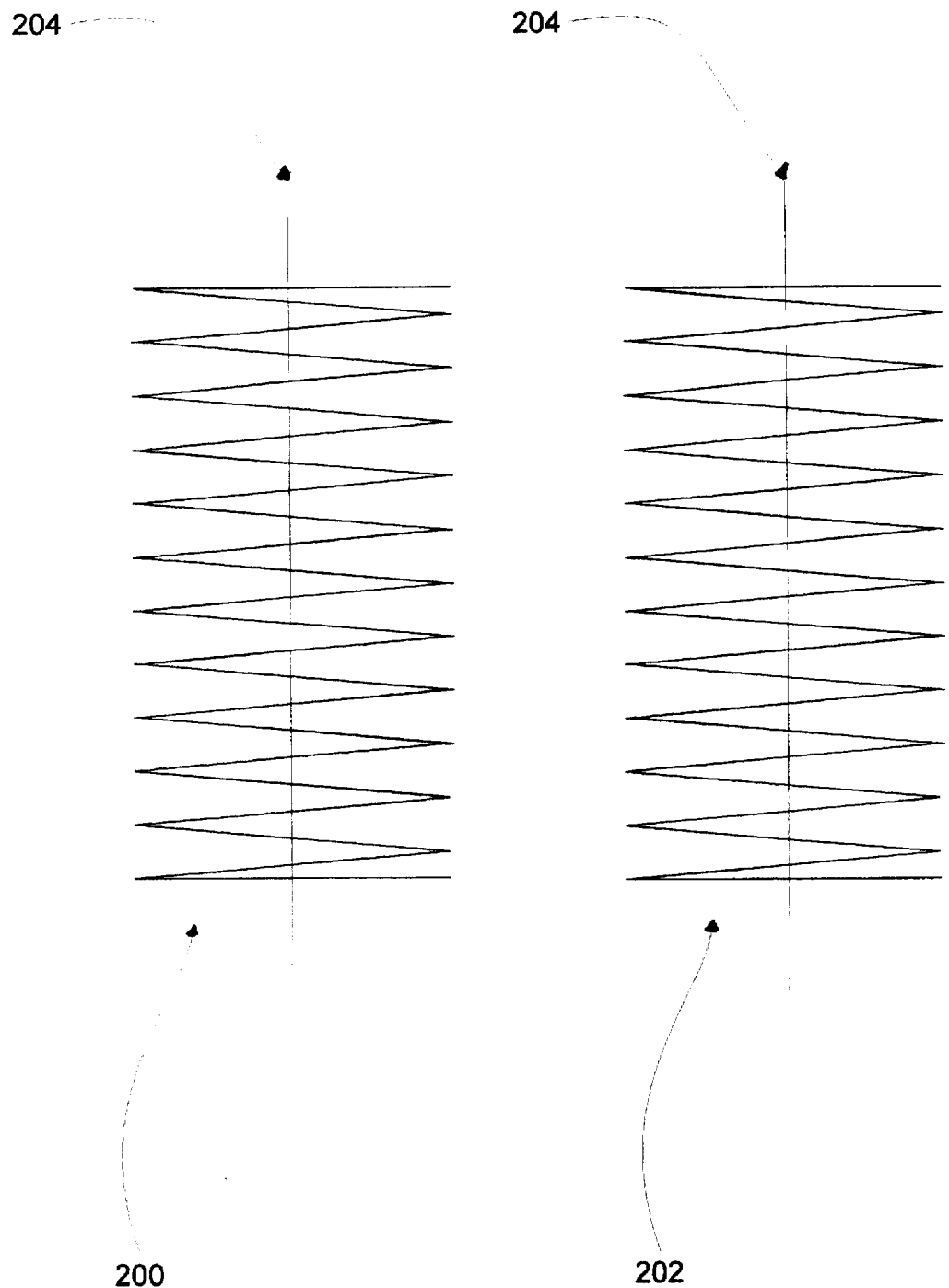
FIG. 36 depicts a period data object for the display of data sampled in a periodic manner such as yearly, monthly, daily; etc.

Now each helix can be tied to a graph, and as the helix turns clockwise or counterclockwise the graph will be updated. The graph will display 9 am daily readings for one year for each city. Two helical structural representation 200 and 202 of periodic data is shown in FIG. 36, each representation 200 and 202 having central axis 204 for rotational operations.

Figure 28:
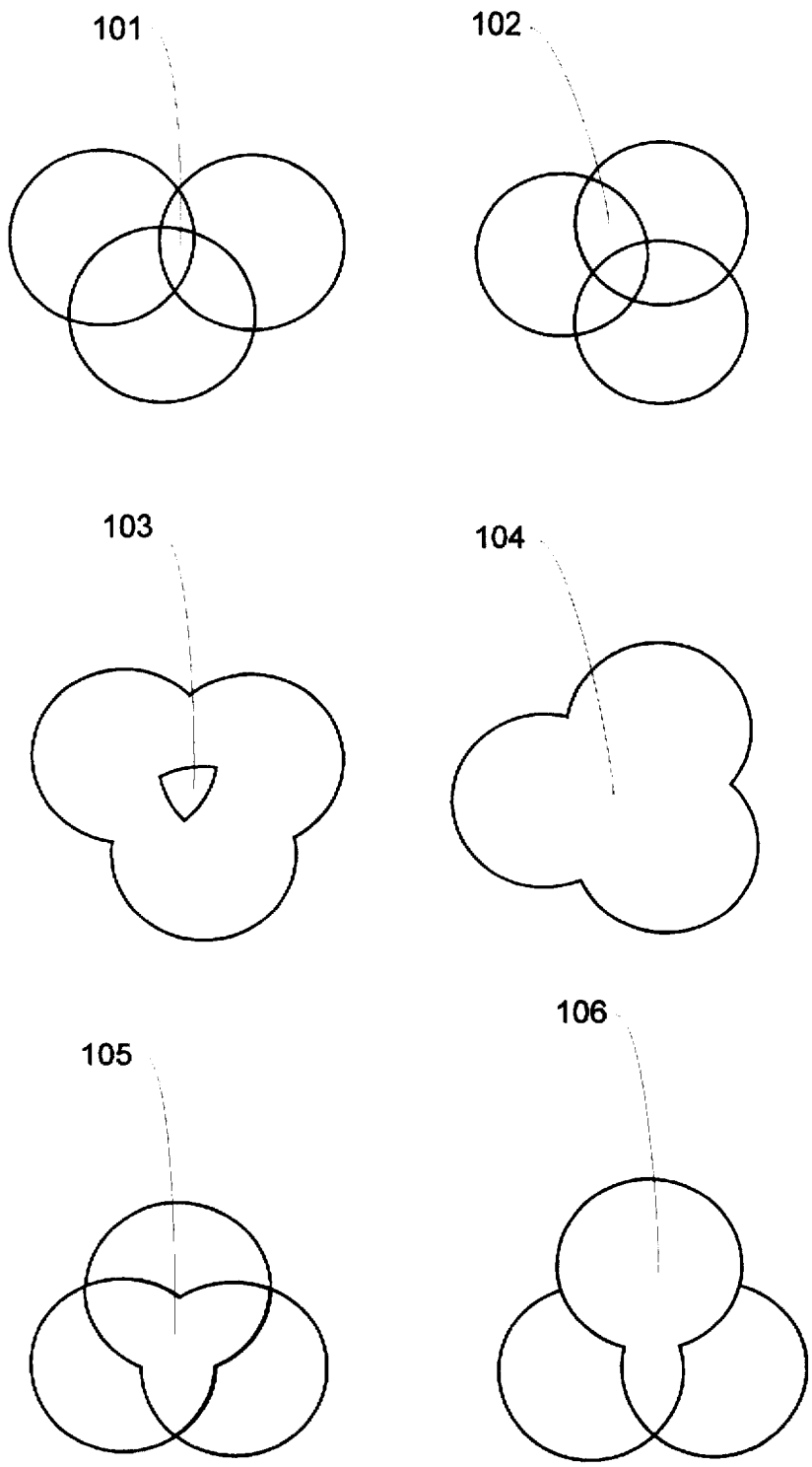
FIG. 28 shows the results of several different set theory based visual operators defined in a 'where' clause of an SQL statement.
Figure 29:
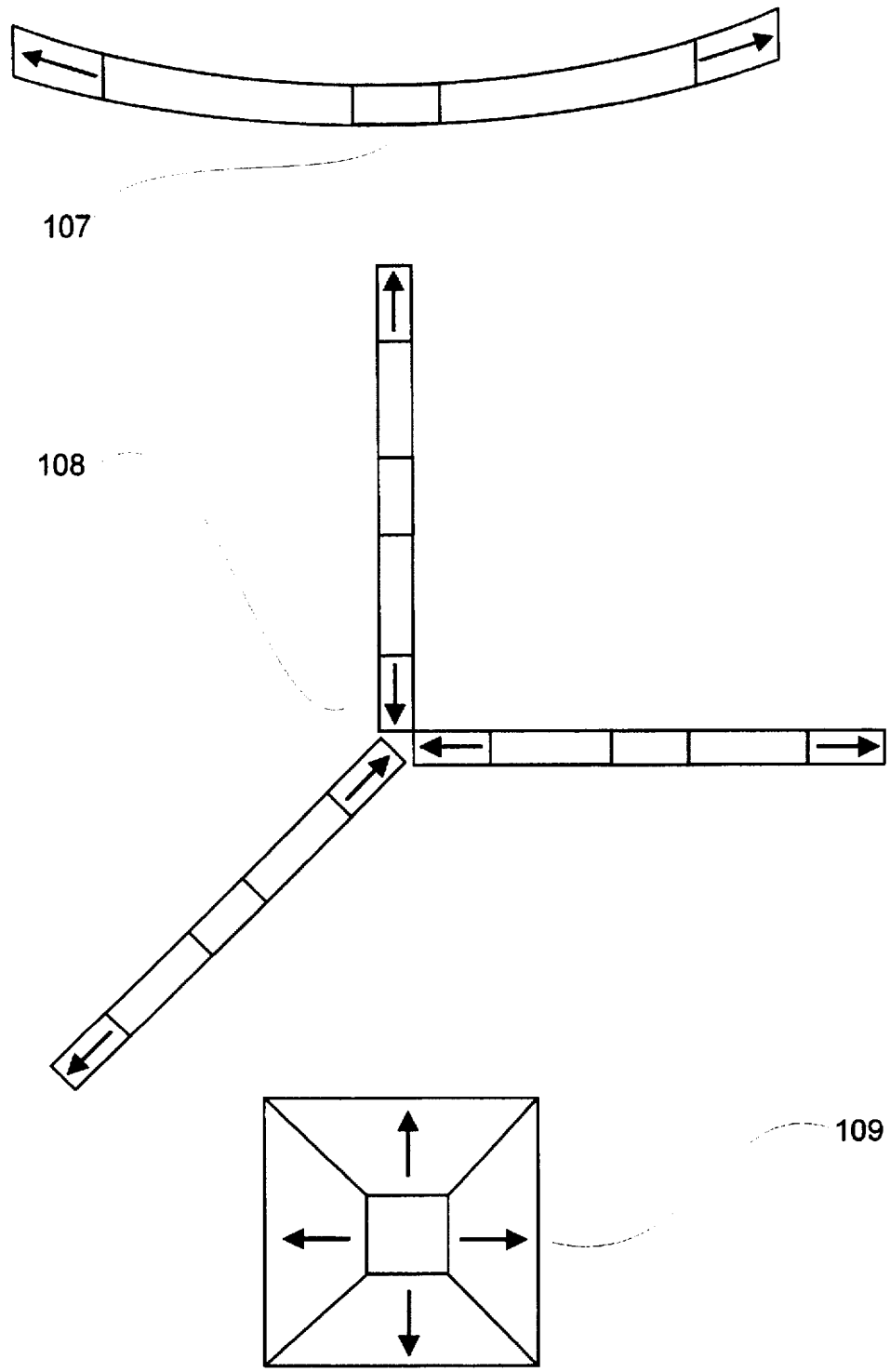
FIG. 29 shows deveral n-gon movement controls for data contained in a different types of n-gons.

The process and product of the present invention can use standard boolean operation to related data as is well known in the art. The process and products of this invention can also use traditional set theory visualization techniques including those shown in FIG. 28. The set theory visual objects can be defined through use of the 'where' clause for SQL statements, 101 shows a and b and c, 102 shows a and b not c, 103 shows (a or b or c) not (a and b and c), 104 shows a or b or c, 105 shows (a and b) or (a and c) or (b and c), 106 shows a or (b and c);

FIG. 29 shows n-gon movement controls, 107 is rotation or spin control, in other words it allows circular movement, 108 is a control to move from one n-gon to another n-gon, from one section to another section, from one layer to another layer, in other words it allows movement along a multidimensional axis, 109 is a control that is 'position' or 'context' sensitive, i.e. when placed on a n-gon(s), section (s), layer(s) it is aware of all possible movements.

Figure 30:
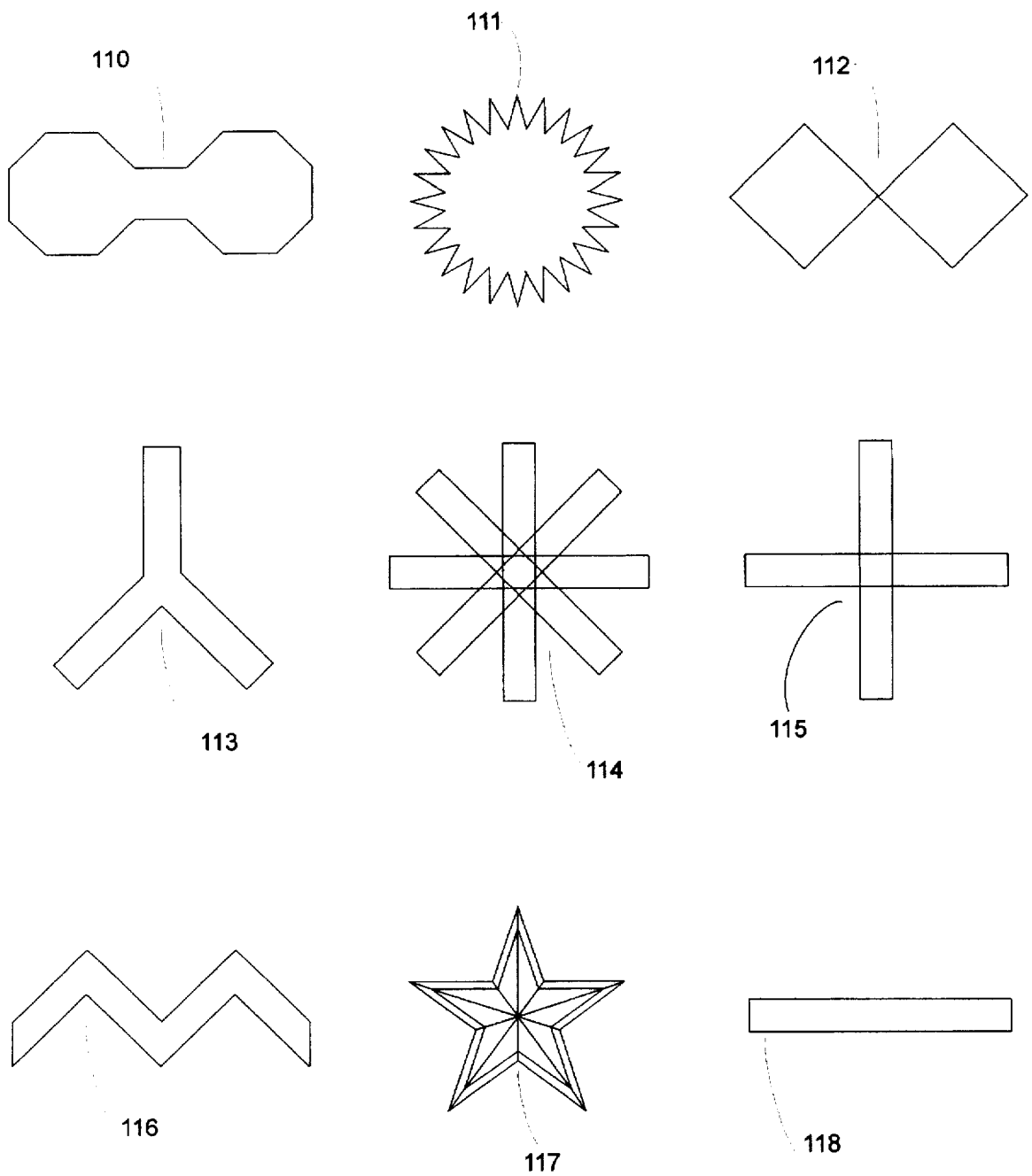
FIG. 30 shows some possible n-gons for use in displaying multi-dimensional data.

Referring to FIG. 30, a set possible n-gons that can be used to display and manipulation multi-dimensional data. The n-gons include, without limitation, an open-connected structure 110; multi-pointed star-like structure 111; a vertex connected structure 112; a Y type structure 113; a multi-rectangular array 114; a dual rectangular array 115; a wave like structure 116; a 3D star structure 117, and a single rectangle 118.

Figure 31:
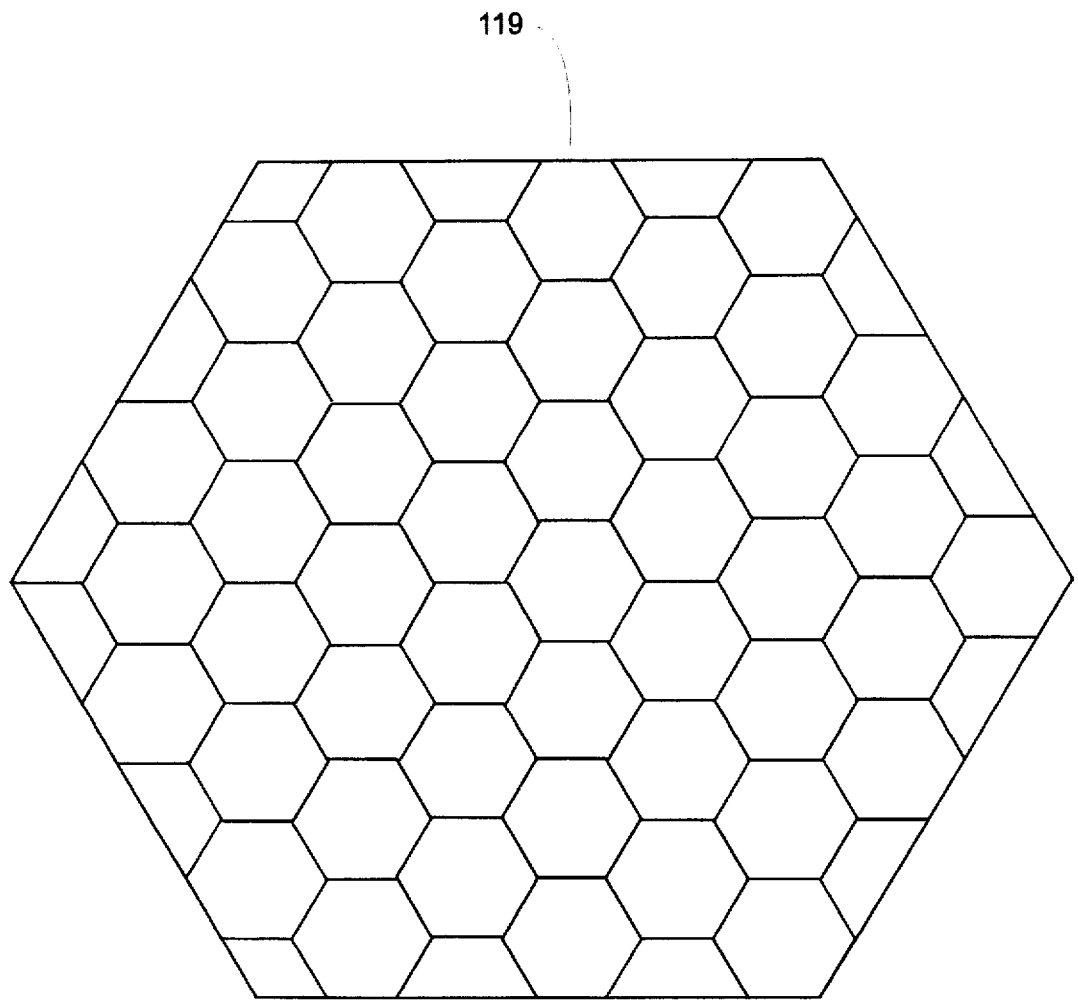
FIG. 31 shows a set of possible n-gons for use in display multi-dimensional data.
Figure 32:
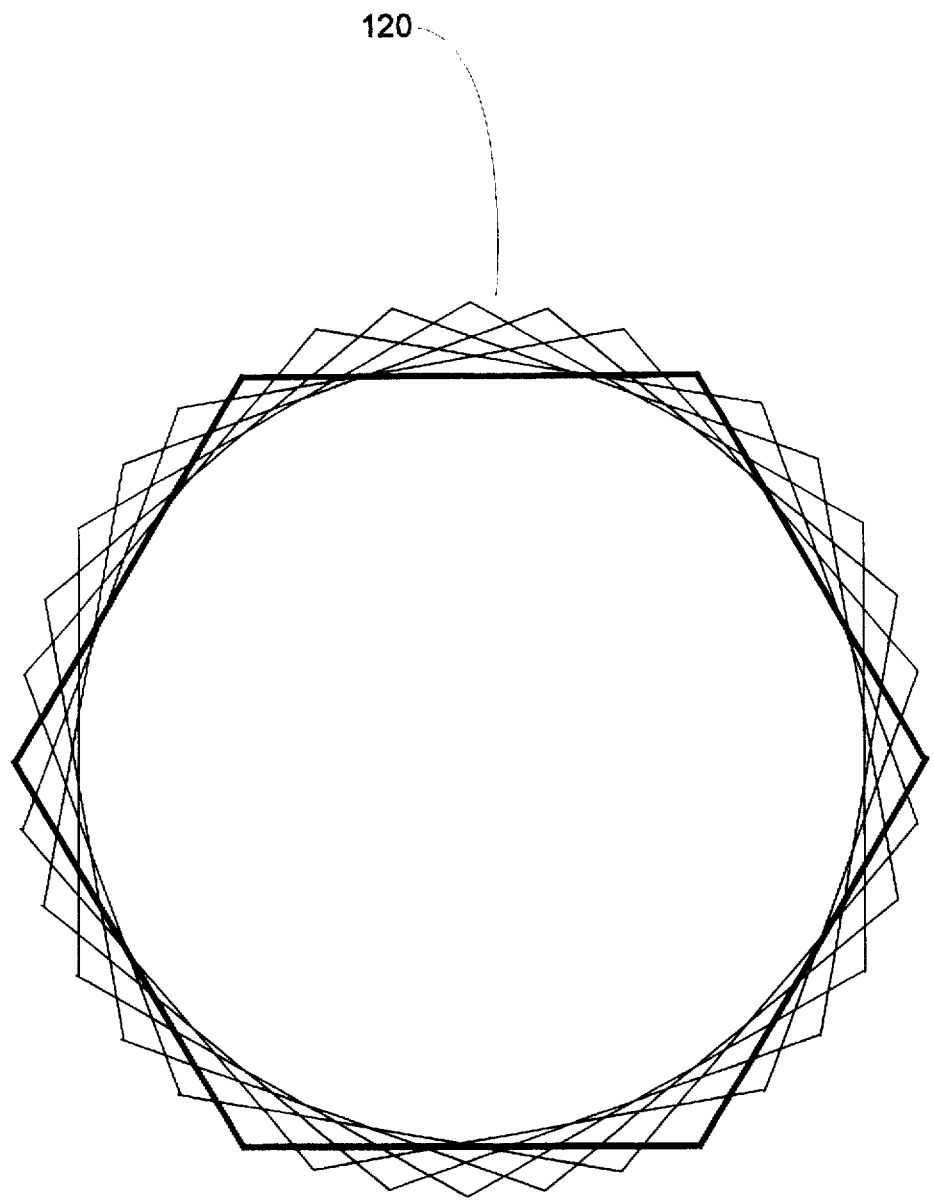
FIG. 32 shows a top view of a turbostrata hexagonal 3D object, i.e., each hexagon is rotated or twisted to form a helical type structure.

FIG. 31 shows a n-gon 119 that is comprised of other n-gons, this figure represents the following characteristics: variation of layers 9, top view of n-gons tessellation, grid or matrix layout for a spreadsheet. FIG. 32 shows a top view of a n-gonal structure 120 that is twisted like a helix, to display all the sections contained in that n-gonal 120. This type of a representation can be used to facilitating selection and zooming to particular n-gons or n-gonal sections.

Figure 33:
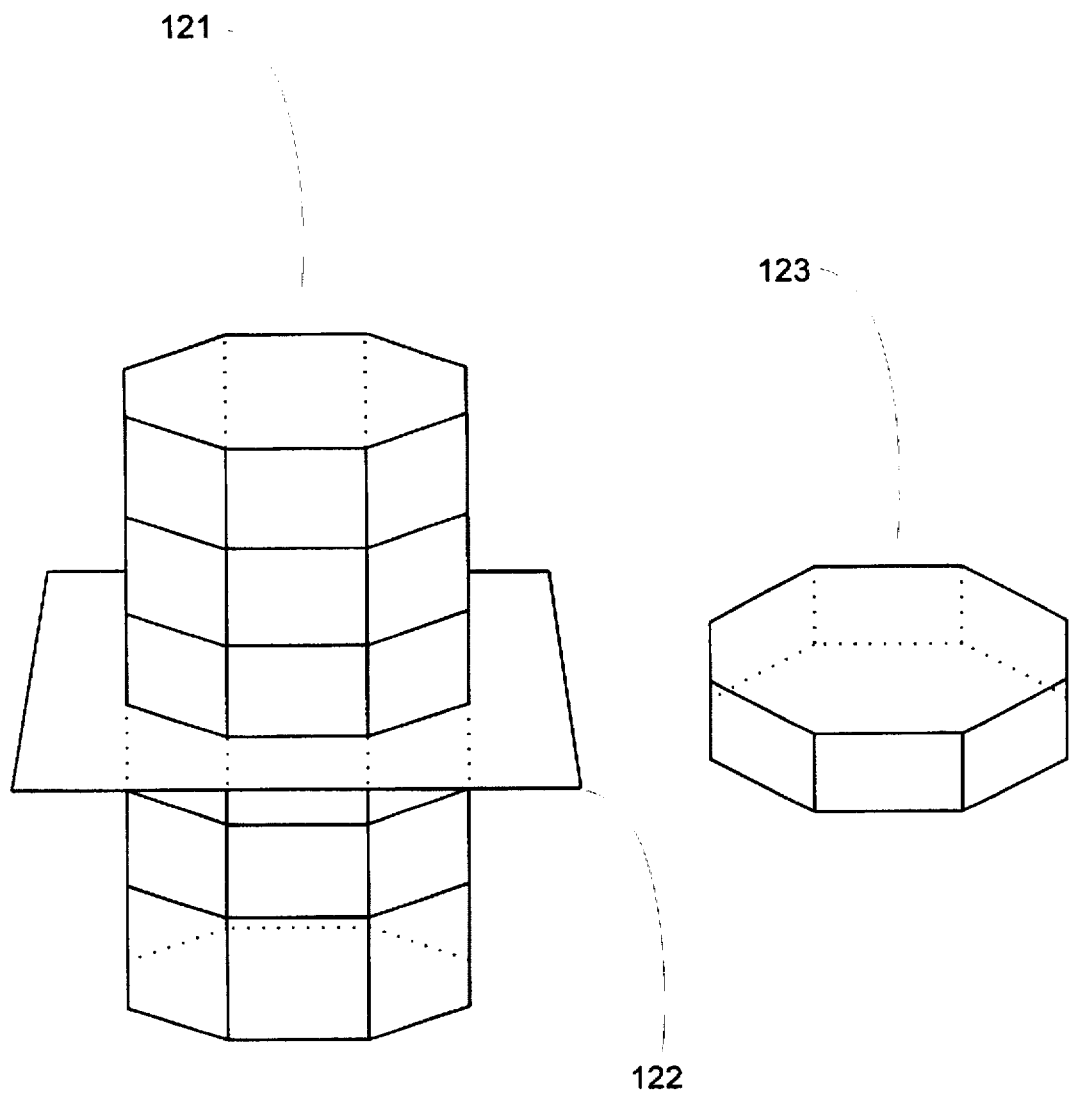
FIG. 33 shows dissection operation of a 3D octagonal data object at plane "X" to produce a pulled out section.
Figure 34:
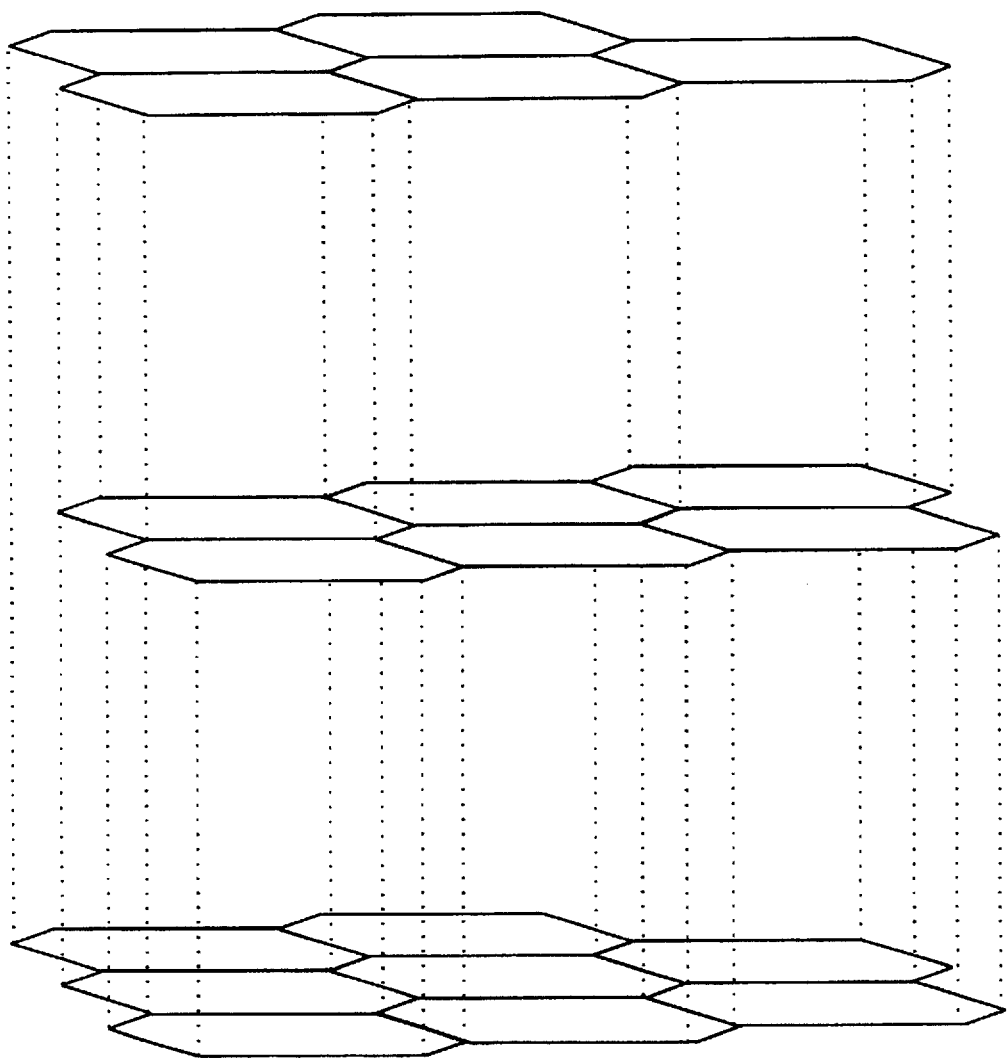
FIG. 34 depicts n-gons placed above and below one another; sections of an n-gon pulled apart from a object; and an n-gon based spreadsheet display format in 3-D space.

Referring now to FIG. 33, a section 123 is shown extracted or pulled along plane 122 from a n-gonal solid 121. This FIG. 33 illustrations the effect of a section or n-gon extraction operation. FIG. 34 depicts a stratified alignment of n-gons which can represent relationship visualization or n-gonal solids in an exploded view.

Figure 35:
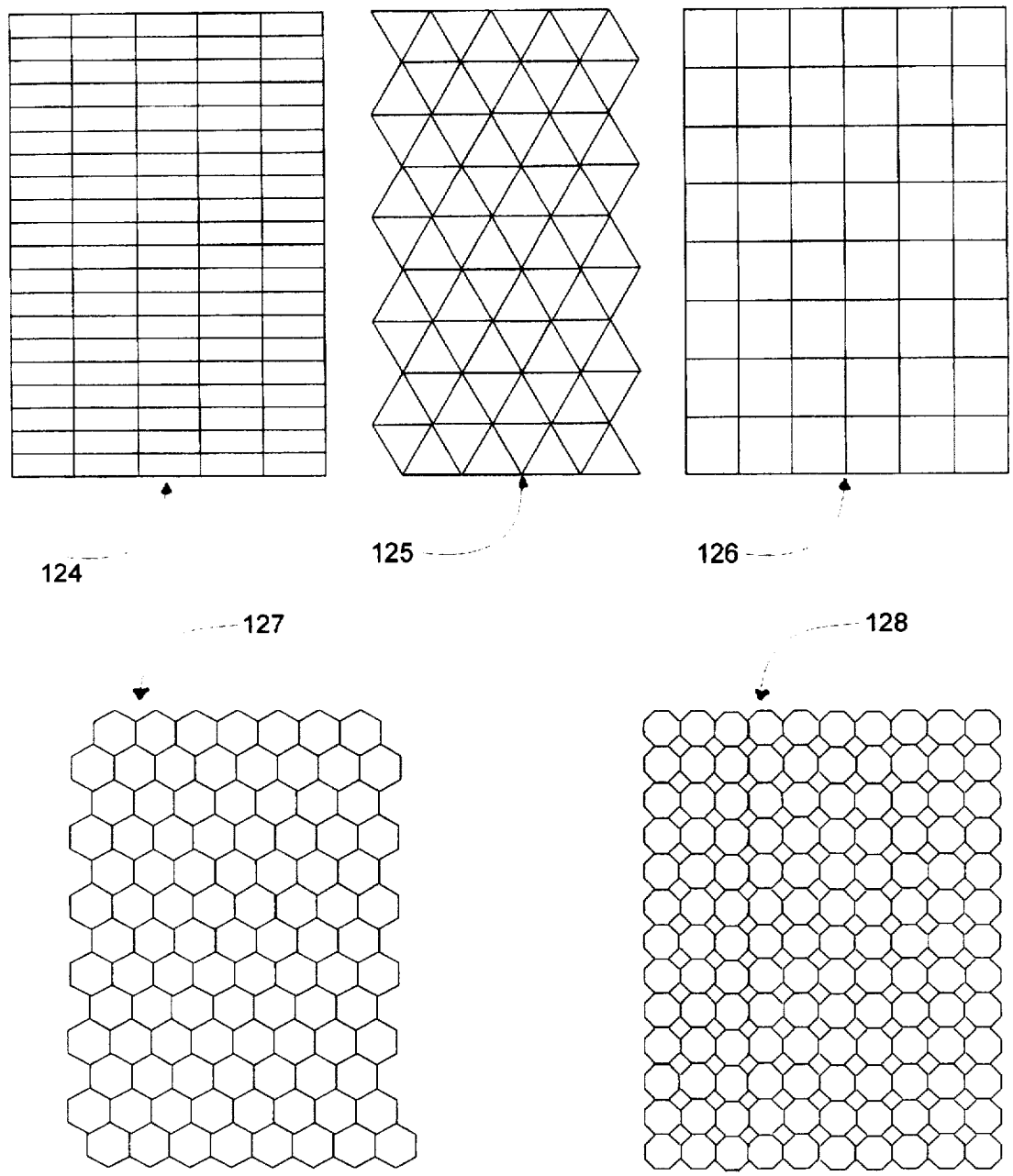
FIG. 35 shows examples of n-gon based tessellations for multi-dimensional spreadsheet grid formats.

Referring now to FIG. 35, several n-gon based tessellations are shown, including the traditional rectangular spreadsheet grid 124; a triangular tessellation 125; a square tessellation 126; a hexagonal tessellation 127; and an octagonal tessellation 128. Of course, any other tessellation structure can be used as well. These tessellation structure can be associated with each Representing Hierarchical Data Currently, there are two types of hierarchies defined for representing multi-dimensional data structures: (1) organization chart type hierarchy and (2) Microsoft Windows Explorer type hierarchy.

Figure 39:
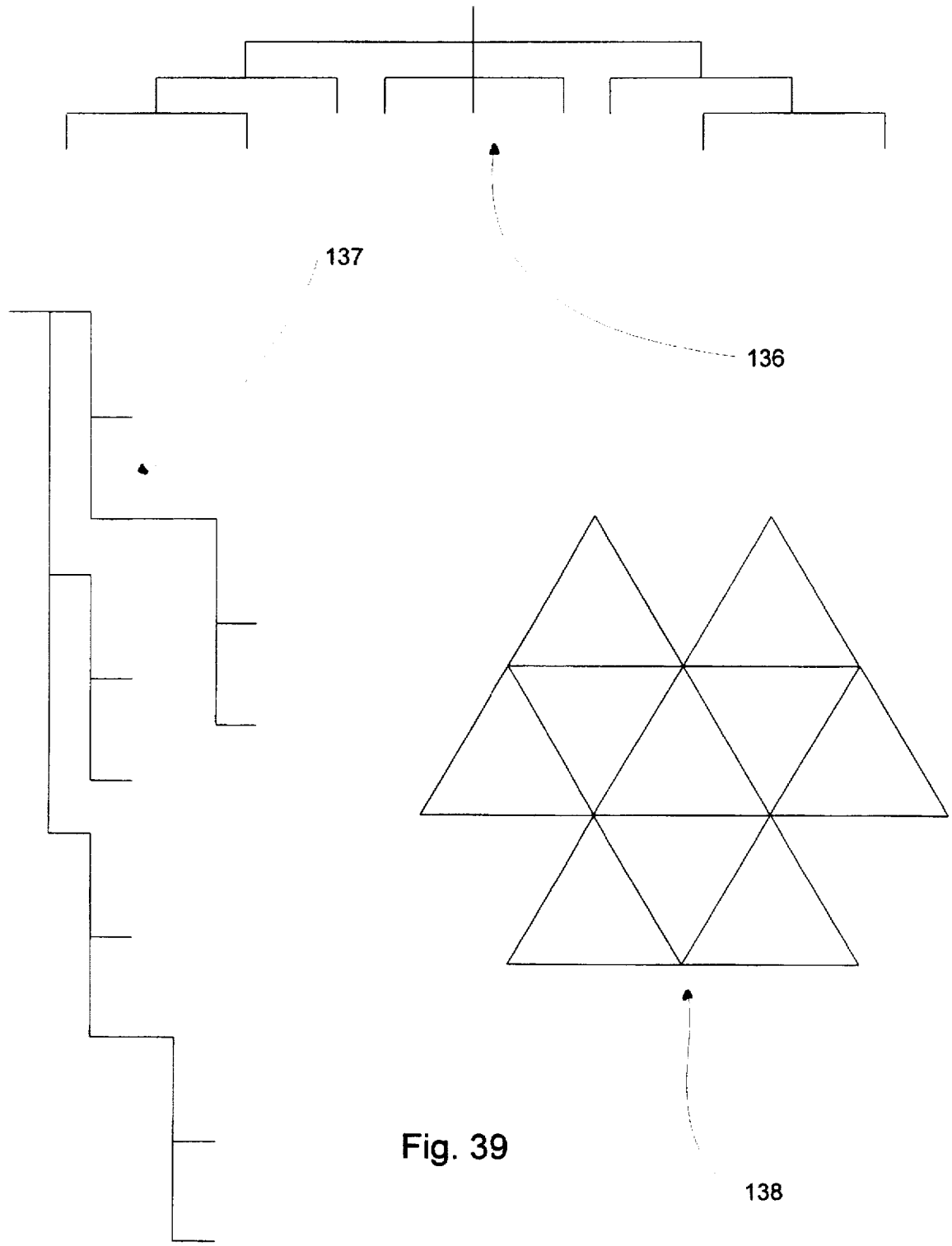
FIG. 39 depicts two conventional hierarchical representations of data and the a similar representation using n-gons.

Organization chart type hierarchy generally looks an inverted tree 136 as shown in FIG. 39. The sub-levels or children are always shown below higher hierarchical levels or parents. This type of hierarchy typically grows wider more rapidly with each generation than it grows taller with each successive generation. Since a parent-child or a sibling—sibling relationship is represented linearly, this type of hierarchy requires left-to-right or right-to-left screen scrolling to view all the members in the hierarchy.

The MS Windows Explorer type hierarchy is similar to a tree laying sideways 137 as shown in FIG. 39. The children are always shown to the right of the parent. This hierarchy grows taller more rapidly with each successive generation than it grows wider. Since a parent-child or a sibling-sibling relationship is represented linearly, this type of hierarchy required top-to-bottom or bottom-to-top screen scrolling to view all the members of the hierarchy.

The representation 138 of FIG. 39 is an equivalent n-gonal representation of the same tree structures 136 and 137. The n-gonal representation is much more compact and visually understandable.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A computer having stored thereon a multi-dimensional data manipulation system comprising a user interface and a multi-dimensional data manipulation system for generating n-gonal representations of multi-dimensional data where the data manipulation system includes: (a) a meta-data manager for extracting data from a data source;(b) an IO broker for coordinating IO between the system and the data sources; (c) import and export routines for importing and exporting information to and from data sources and the system and within the system; (d) a database connectivity engine for communicating with a data source manager for processing of data source queries; (e) a plurality of dynamically generated SQL routines to optimize runtime performance; (f) a query estimate manager for estimating the time to retrieve desired information from a data source; (g) size and time keeping routines for computer resource allocation and timing; (h) a data carrousel or object controller for generating and manipulating data objects; (i) a selection exception agent; (j) a spreadsheet controller for assigning spreadsheet functionality of one or more side of a n-gon; (k) a schema synchronization manager for consolidating data schema and logical schema from different data sources; (l) a threads manager; (m) a macro and/or scripting language manager for executing multi-step user defined operations; (n) an API set; (o) an analytic engine for performing routine analyses on an n-gonal representation of data; (p) manipulation routines for manipulating the data objects within the n-gonal representation; (q) filtering and/or exception routines for masking undesired information or highlighting desired information; and (r) a communication manager for communicating with other programs and systems; and where the user interface includes: (a) a window generator; (b) a n-gon generator; (c) a n-gonal solid generator; (d) n-gon manipulation routines, (e) user dialog boxes; (f) user scroll bars; (g) a tool bar and (h) a relationship generator.

2. The computer of claim 1, further comprising (s) a pivot manager; (t) a plurality of wizards;(u) at least one pro-active agent; (v) an E-mail interface; (w) a fax interface; and (x) a pager interface.

3. The computer of claim 1, further comprising a windowing operating system, a graphics display device, a memory, and at least one direct digital storage device.

4. The computer of claim 1, further comprising a graphics system of callable routines for display and manipulation of polygons and polygonal solids.

5. The computer of claim 1, wherein the meta-data manager interfaces with a data source data manager by (a) processing data source selections of a user; (b) pulling the schema from the data source manager, (c) storing the schema, (d) repeating steps a–c for all all selected data sources, (e) resolving and consolidating the schema; (f) translating items names and resolving item name conflicts; and (g) exporting the consolidated schema to the UI.

6. The computer of claim 1, wherein the data source is at least one database.

7. A process implemented in a computer memory for displaying and manipulating multidimensional data, comprising the steps of:

a. selecting data from at least one data source;
  b. retrieving a designation schema describing the data in the data source;
  c. displaying the schema in a data schema window in a display window of a display device;
  d. arranging schema items from the schema into a desired categorization structure in a categorization structure window in the display window;
  e. generating an n-gon for each schema item within the structure so that each n-gon is the same dimensionality of the data item in the structure;
  f. populating each face of each n-gon with the appropriate data value;
  g. displaying the n-gons in a desired n-gonal representation in a in-gonal display window; and
  h. manipulating the n-gonal representation to determine data trends, find data solutions, or visualize the multidimensional data.

8. The process of claim 7, wherein the step of arranging the schema items includes the steps of:

i. processing a user selected schema item;
  ii. dropping the item into the categorization window;
  iii. querying the user to invoke a item rename operation;
  iv. defining relationships between selected schema items;
  v. exporting the completed categorization structure to the UI.

9. A digital storage device having encoded thereon, in computer readable form, a method for displaying and manipulating multi-dimensional data; said process comprising:

a. selecting data from at least one data source;
  b. retrieving a designation schema describing the selected data from the data source;
  c. displaying the schema in a data schema window in a display window of a display device;
  d. arranging schema items from the schema into a desired categorization structure in a categorization structure window in the display window;

e. generating an n-gon for each schema item within the structure so that each n-gon is the same dimensionality of the data item in the structure;

f. populating each face of each n-gon with the appropriate data value;

g. displaying the n-gons in a desired n-gonal representation in a in-gonal display window; and h. manipulating the n-gonal representation to determine data trends, find data solutions, or visualize the multidimensional data.

10. The process of claim 7, wherein the step of arranging the schema items includes the steps of:

i. processing a user selected schema item;

ii. dropping the item into the categorization window;

iii. querying the user to invoke a item rename operation;

iv. defining relationships between selected schema items;

v. exporting the completed categorization structure to the UI.

\* \* \* \* \*